United States Patent
Luo et al.

(10) Patent No.: US 7,333,653 B2
(45) Date of Patent: Feb. 19, 2008

(54) DETECTING AND CORRECTING REDEYE IN AN IMAGE

(75) Inventors: Huitao Luo, Sunnyvale, CA (US); Jonathan Yen, San Jose, CA (US); Daniel Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 815 days.

(21) Appl. No.: 10/653,019

(22) Filed: Aug. 29, 2003

(65) Prior Publication Data

US 2005/0047655 A1    Mar. 3, 2005

(51) Int. Cl.
G06K 9/00 (2006.01)
G06K 9/34 (2006.01)

(52) U.S. Cl. .................. 382/165; 382/163; 382/164

(58) Field of Classification Search .............. None
See application file for complete search history.

(56) References Cited

U.S. PATENT DOCUMENTS

| | | | |
|---|---|---|---|
| 5,432,863 A | 7/1995 | Benati et al. | |
| 5,664,072 A | 9/1997 | Ueda et al. | |
| 5,748,764 A | 5/1998 | Benati et al. | |
| 6,009,209 A | 12/1999 | Acker et al. | |
| 6,016,354 A | 1/2000 | Lin et al. | |
| 6,151,403 A * | 11/2000 | Luo | 382/117 |
| 6,172,681 B1 | 1/2001 | Ueda | |
| 6,292,574 B1 * | 9/2001 | Schildkraut et al. | 382/117 |
| 6,873,743 B2 * | 3/2005 | Steinberg | 382/275 |
| 6,895,112 B2 * | 5/2005 | Chen et al. | 382/167 |
| 7,039,222 B2 * | 5/2006 | Simon et al. | 382/118 |
| 7,058,209 B2 * | 6/2006 | Chen et al. | 382/117 |
| 7,062,086 B2 * | 6/2006 | Chen et al. | 382/165 |
| 2002/0176623 A1 | 11/2002 | Steinberg | |
| 2003/0063097 A1 | 4/2003 | Prabhakar et al. | |
| 2003/0108244 A1 | 6/2003 | Li et al. | |
| 2003/0110147 A1 | 6/2003 | Li et al. | |

FOREIGN PATENT DOCUMENTS

EP  0911759  4/1999
EP  0961225  12/1999

OTHER PUBLICATIONS

M. Gaubatz and R. Ulichney, "Automatic red-eye detection and correction," ICIP, New York, 2002.
R-L Hsu, M. Abdel-Mottaleb and A.K. Jain, "Face Detection in Color Images," ICIP, Thessaloniki, 2001.
"Better Pictures, More Choices," Eastman Kodak Company, (Feb. 5, 2002).
"Industry's first completely automatic red eye detection and reduction system launched," Pictos Technologies, Inc. (Apr. 2002).

(Continued)

*Primary Examiner*—Wenpeng Chen
*Assistant Examiner*—Yuzhen Ge

(57) ABSTRACT

Systems and methods of detecting and correcting redeye in an image are described. In one aspect, pixels of the input image are segmented based on projections of color values of the pixels onto two-dimensional thresholding planes. Candidate redeye pixel areas are identified in the input image based on the segmented pixels of the input image.

29 Claims, 15 Drawing Sheets

OTHER PUBLICATIONS

"Red-Eye Removal," Pixology—Product Categories, (before Apr. 2003).

Jianzhong Fang et al., "A Colour Histogram Based Approach to Human Face Detection," VIE 2003, University of Surrey, Guidford, UK, 4 pages (Jul. 2003).

Freund et al., "A Short Introduction to Boosting," Journal of Japanese Society for Artificial Intelligence, 14(5): 771-780, Sep. 1999.

Patti A et al—"Automatic Digital Redeye Reduction"—Proc Int'l Conference on Image Processing—vol. 3—Oct. 4, 1998.

Czubin K et al—"On the Redeye Effect Removal Algorithm"—European Conference on Colour in Graphics, Image and Vision—Apr. 2, 2002.

Gaubatz M et al—"Automatic Red-Eye Detection and Correction"—IEEE Proc Int'l Conference on Image Processing—vol. 2 of 3—Sep. 22, 2002.

* cited by examiner

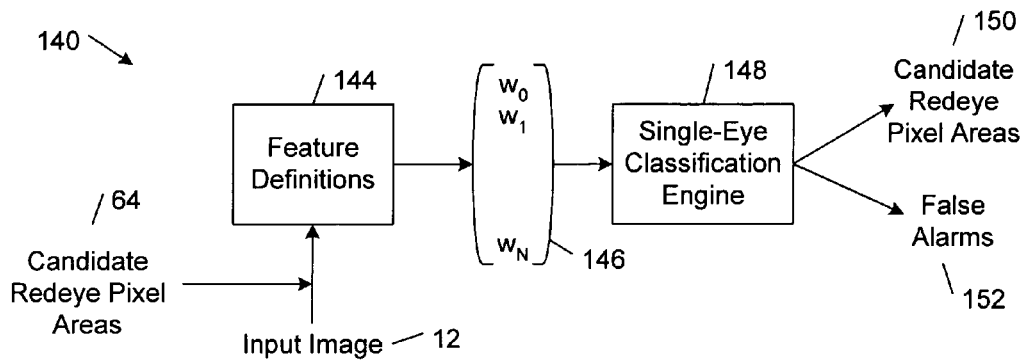
FIG. 14
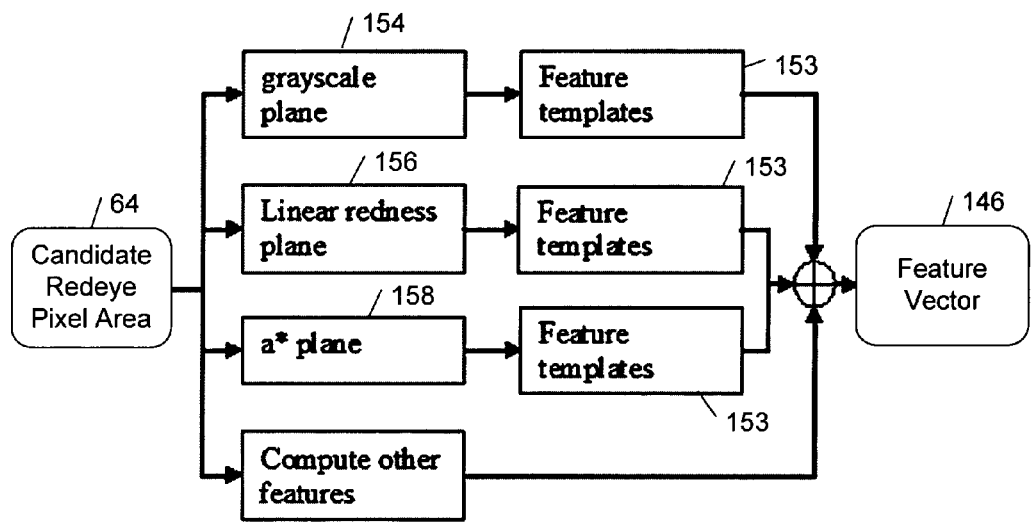
FIG. 15
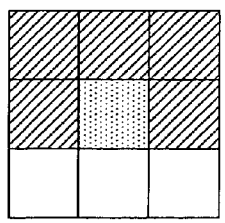   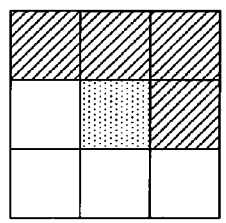   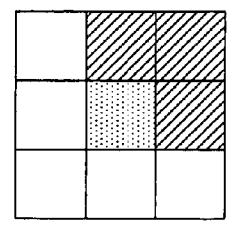
FIG. 16A          FIG. 16B          FIG. 16C

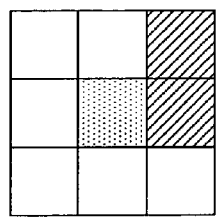 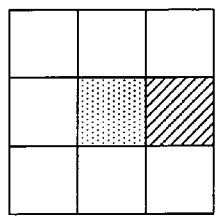 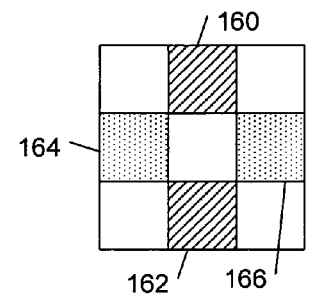
FIG. 16D  FIG. 16E  FIG. 16F
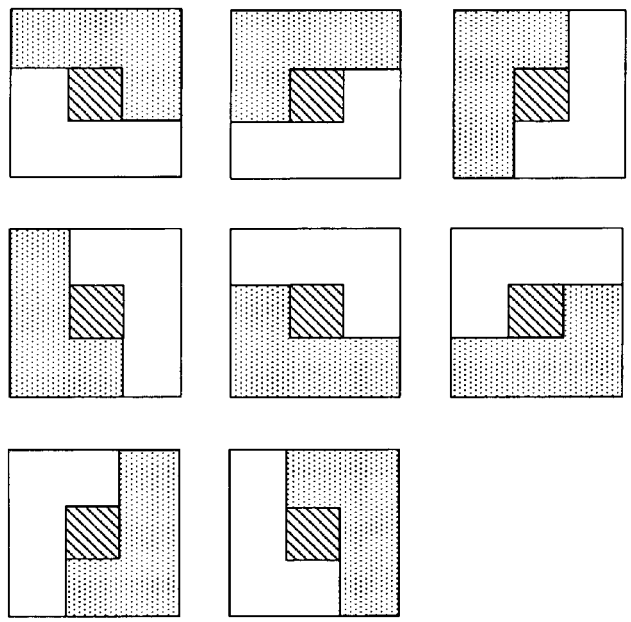
FIG. 17

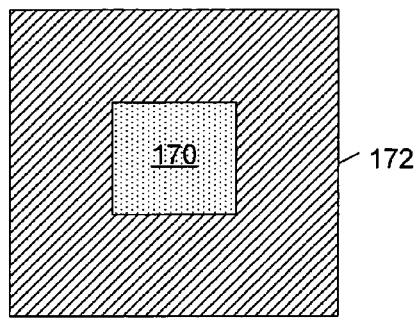
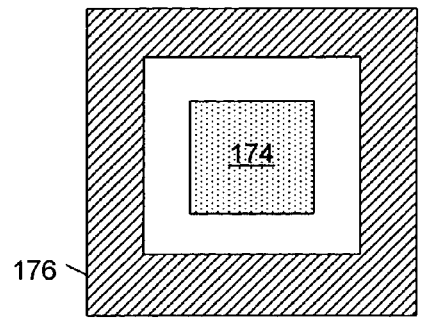
FIG. 18A    FIG. 18B
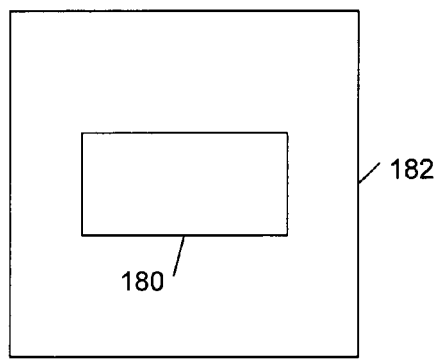
FIG. 19A    FIG. 19B
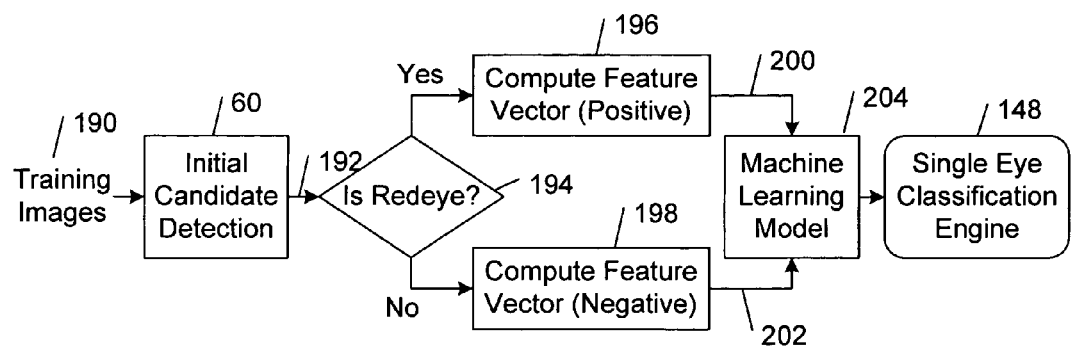
FIG. 20

 
FIG. 28A    FIG. 28B
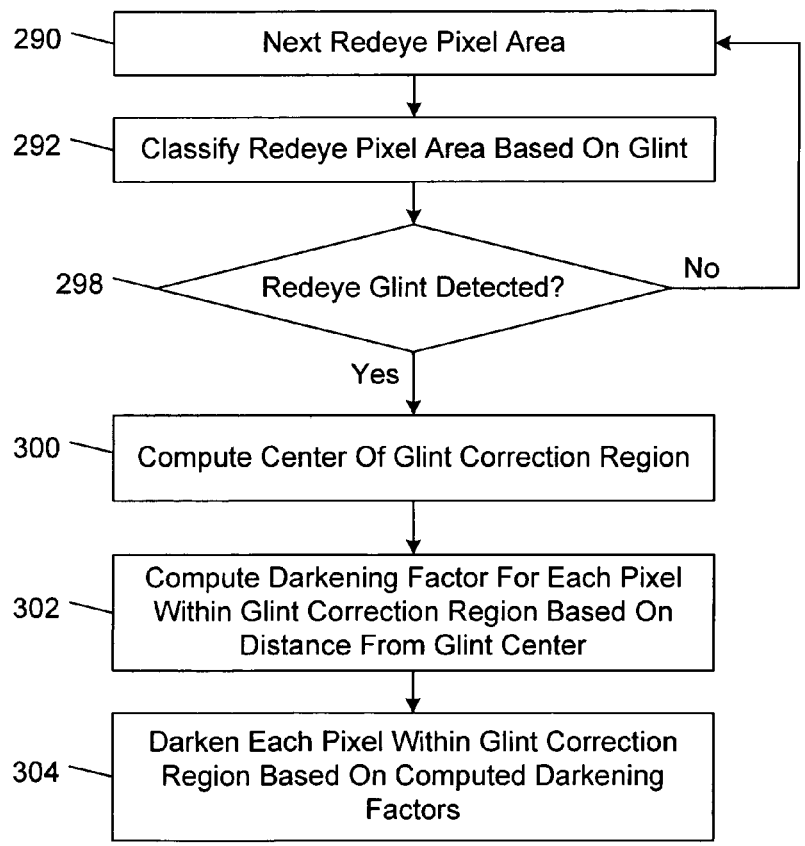
FIG. 29

US 7,333,653 B2

DETECTING AND CORRECTING REDEYE IN AN IMAGE

CROSS-REFERENCE TO RELATED APPLICATIONS

This application relates to the following co-pending applications, each of which is incorporated herein by reference: U.S. patent application Ser. No. 10/424,419, filed Apr. 28, 2003, by Huitao Luo et al., and entitled "DETECTING AND CORRECTING RED-EYE IN A DIGITAL IMAGE;" and U.S. patent application Ser. No. 10/653,021, filed on even date herewith, by Huitao Luo et al., and entitled "SYSTEMS AND METHODS OF DETECTING AND CORRECTING REDEYE IN AN IMAGE SUITABLE FOR EMBEDDED APPLICATIONS."

TECHNICAL FIELD

This invention relates to systems and methods of detecting and correcting redeye in an image.

BACKGROUND

Redeye is the appearance of an unnatural reddish coloration of the pupils of a person appearing in an image captured by a camera with flash illumination. Redeye is caused by light from the flash reflecting off blood vessels in the person's retina and returning to the camera.

Several techniques have been proposed to reduce the redeye effect. A common redeye reduction solution for cameras with a small lens-to-flash distance is to use one or more pre-exposure flashes before a final flash is used to expose and capture an image. Each pre-exposure flash tends to reduce the size of a person's pupils and, therefore, reduce the likelihood that light from the final flash will reflect from the person's retina and be captured by the camera. In general, pre-exposure flash techniques typically only will reduce, but not eliminate, redeye.

A large number of image processing techniques have been proposed to detect and correct redeye in color images. In general, these techniques typically are semi-automatic or automatic. Semi-automatic redeye detection techniques rely on human input. For example, in some semi-automatic redeye reduction systems, a user must manually identify to the system the areas of an image containing redeye before the defects can be corrected. Many automatic redeye reduction systems rely on a preliminary face detection step before redeye areas are detected. A common automatic approach involves detecting faces in an image and, subsequently, detecting eyes within each detected face. After the eyes are located, redeye is identified based on shape, coloration, and brightness of image areas corresponding to the detected eye locations. In general, face-detection-based automatic redeye reduction techniques have high computation and memory resource requirements. In addition, most of the face detection algorithms are only able to detect faces that are oriented in an upright frontal view; these approaches cannot detect faces that are rotated in-plane or out-of-plane with respect to the image plane.

SUMMARY

The invention features systems and methods of detecting and correcting redeye in an image.

In one aspect, the invention features a scheme (systems and methods) for processing an input image. In accordance with this inventive scheme, pixels of the input image are segmented based on projections of color values of the pixels onto two-dimensional thresholding planes. Candidate redeye pixel areas are identified in the input image based on the segmented pixels of the input image.

In another aspect of the invention, candidate redeye pixel areas are identified in the input image based on a first redeye color model. Candidate redeye pixel areas are identified in the input image based on a second redeye color model different from the first redeye color model. Candidate redeye pixel areas identified based on the first and second redeye color models are merged into a set of candidate redeye pixel areas.

In another aspect of the invention, a set of candidate redeye pixel areas are identified in the input image. Input image data is projected into a feature space spanned by multiple features to generate feature vectors respectively representing the candidate redeye pixel areas in the feature space. Candidate redeye pixel areas are filtered from the set based on the generated feature vectors.

In another aspect of the invention, redeye pixel areas are detected in the input image. Glowing redeye pixel areas are segmented from non-glowing redeye pixel areas. Regions of the segmented glowing redeye pixel areas are re-colored.

Other features and advantages of the invention will become apparent from the following description, including the drawings and the claims.

DESCRIPTION OF DRAWINGS

FIG. 14 is a diagrammatic view of a single-eye verification process for filtering candidate redeye pixel areas from an initial candidate set.

FIG. 15 is a diagram of information flow in an embodiment of a method of generating a feature set for verifying candidate redeye pixel areas.

FIGS. 16A-16F each shows a respective circular feature template.

FIG. 17 shows eight different rotational orientations of the circular feature template of FIG. 16B.

FIGS. 18A and 18B each shows a respective concentric feature template.

FIG. 19A is an exemplary grayscale iris area surrounding by a neighborhood area.

FIG. 19B is another exemplary grayscale iris area surrounded by a set of eight neighborhood areas.

FIG. 20 is a flow diagram of a method of training an embodiment of a single-eye verification classifier.

FIG. 28A is an image of a boy with glowing redeyes before being corrected by the method of FIG. 25.

FIG. 28B is an image of the boy of FIG. 28A after the glowing redeyes have been corrected by the method of FIG. 25.

FIG. 29 is a flow diagram of an embodiment of a method of correcting redeye pixel areas containing large glowing glint.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such element.

In general, the redeye detection and correction embodiments described herein may be incorporated into any system or method in which such functionality is desired, including embedded environments, which typically have limited processing and memory resources.

I. System Overview

Figure 1:
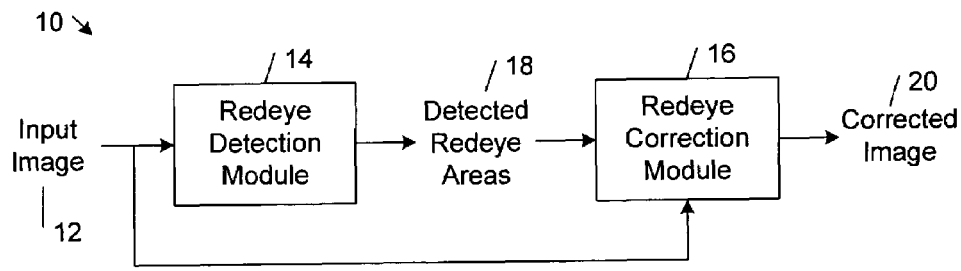
FIG. 1 is a block diagram of an embodiment of a system for detecting and correcting redeye in a digital image.

FIG. 1 shows an embodiment of a system 10 for detecting and correcting redeye pixels in a digital input image 12 that includes a redeye detection module 14 and a redeye correction module 16. Redeye detection module 14 automatically detects areas 18 in input image 12 likely to contain redeye. Redeye correction module 16 automatically corrects the detected redeye areas 18 to generate a corrected image 20. In general, the redeye detection and redeye correction modules 14, 16 of system 10 are not limited to any particular hardware or software configuration, but rather they may be implemented in any computing or processing environment, including in digital electronic circuitry or in computer hardware, firmware, device driver, or software. For example, in some implementations, these redeye detection and redeye correction modules 14, 16 may be embedded in the hardware of any one of a wide variety of electronic devices, including digital cameras, printers, and portable electronic devices (e.g., mobile phones and personal digital assistants).

Figure 2:
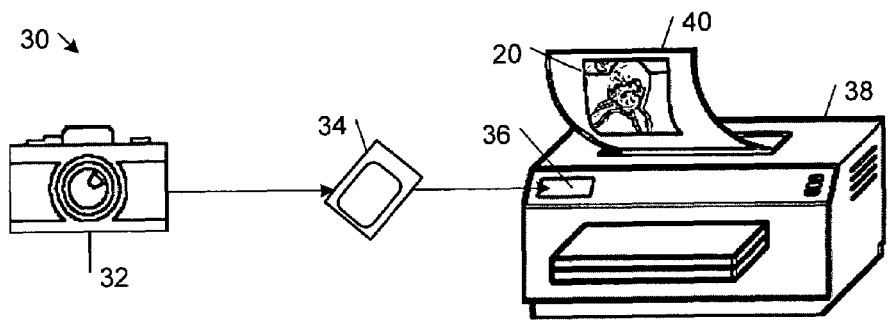
FIG. 2 is a diagrammatic view of a printer system incorporating an embedded embodiment of a system for detecting and correcting redeye in a digital image.

FIG. 2 shows an exemplary application environment 30 for the detection and correction embodiments described herein. A digital camera 32 (e.g., an HP® PHOTOSMART® digital camera available from Hewlett-Packard Company of Palo Alto, Calif., U.S.A.) captures images of scenes and stores the captured images on a memory card 34 (e.g., a secured digital (SD) multimedia card (MMC)). The memory card 34 may be plugged into a slot 36 of a printer system 38 (e.g., a PHOTOSMART® printer, which is available from Hewlett-Packard Company of Palo Alto, Calif., U.S.A.). Printer system 38 accesses data corresponding to an input image stored on the memory card 34, automatically detects and corrects redeye in the input image, and prints a hard copy 40 of the corrected image 20. In some implementations, printer system 38 displays a preview of the corrected image 20 and awaits user confirmation to proceed with printing before the corrected image 20 is printed.

Figure 3:
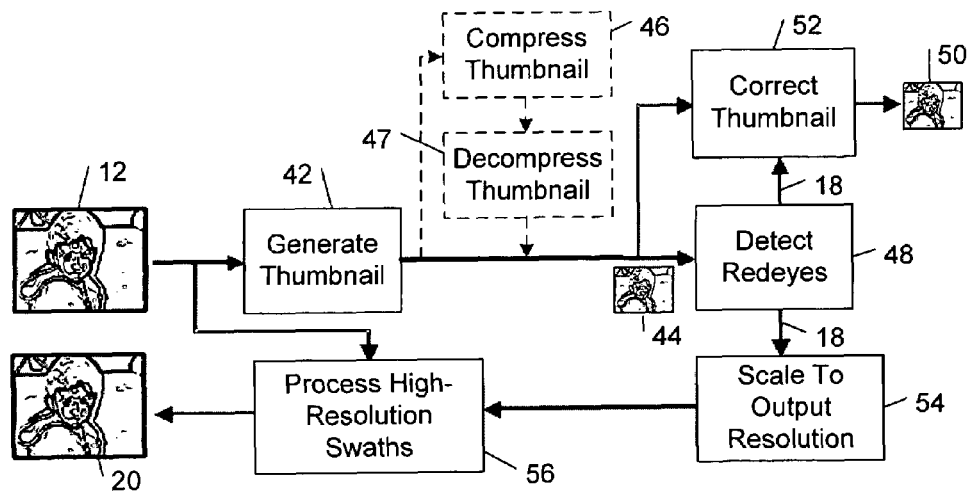
FIG. 3 is a flow diagram of an embodiment of a method of detecting and correcting redeye in a digital image suitable for embedded applications.

FIG. 3 shows a work flow diagram of an implementation of a redeye detection and correction process that is adapted for the printer system application environment 30 of FIG. 2. In this process implementation, the input image 12 is subsampled to generate a thumbnail image 44 (step 42). The thumbnail image optionally is compressed to generate a compressed thumbnail image and, thereby, reduce the memory required to store thumbnail image 44 (step 46). The compressed thumbnail image is decompressed for subsequent processing (step 47). Redeye detection module 14 detects redeye regions 18 in the thumbnail image 44 (step 48). Based on the detected redeye areas 18, redeye correction module 16 corrects the thumbnail image 44 to generate a corrected thumbnail image 50 (step 52). Because redeye detection module 14 operates on a thumbnail of the original input image 12, redeye detection module 14 can rapidly detect redeye regions in environments in which one or both of the processing resources and the memory resources are limited.

In response to user confirmation to proceed with printing, redeye correction module 16 maps the detected redeye areas 18 to a version of the input image scaled to a prescribed output resolution (step 54). Redeye correction module 16 corrects redeye in the input image at the prescribed output resolution to generate the corrected image 20 (step 56). In some implementations, the redeye correction module 16 corrects redeye on a line-by-line basis without reference to pixel data in adjacent lines. In this way, redeye correction module 16 may operate in embedded environments in which one or both of the processing resources and the memory resources are severely constrained, while still providing exceptional real-time redeye correction results.

In some implementations, the redeye correction module 16 automatically corrects the detected redeye pixel areas without awaiting user confirmation.

II. Detecting Redeye Pixel Areas

A. Redeye Detection Module Overview

Figure 4:
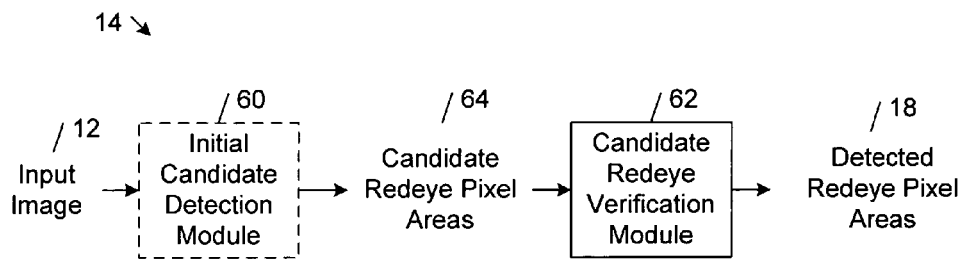
FIG. 4 is a block diagram of components of an embodiment of a redeye detection module.

Referring to FIG. 4, in some embodiments, redeye detection module 14 includes an initial candidate detection module 60 and a candidate redeye verification module 62. Initial candidate detection module 60 identifies an initial set 64 of candidate redeye pixel areas in input image 12, and candidate redeye verification module 62 filters false alarms (i.e., candidate redeye pixel areas with a low likelihood of corresponding to actual redeyes in input image 12) from the initial set 64 of candidate redeye pixel areas. As used in the following sections, input image 12 may correspond to any image, including an original image and a thumbnail (i.e., sub-sampled version) of an original image.

B. Initial Candidate Detection Module

As explained in detail below, in some embodiments, initial candidate detection module 60 identifies candidate redeye pixel areas using multiple different redeye color models and merges the identified areas into the inclusive initial set 64 of candidate redeye pixel areas. In this way, initial candidate detection module 60 ensures that there is a high likelihood that all of the actual redeyes in input image 12 are included in the initial set 64 of candidate redeye pixel areas.

Figure 5:
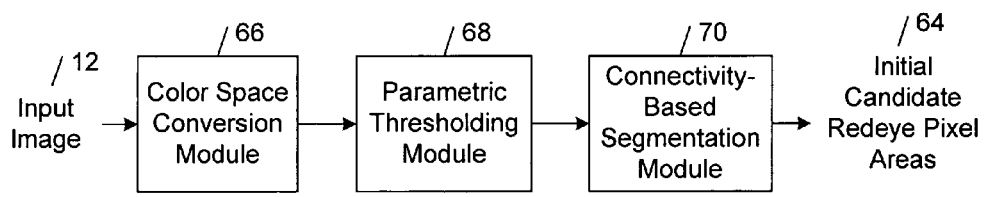
FIG. 5 is a block diagram of components of an embodiment of an initial candidate detection module.

Referring to FIG. 5, in some embodiments, initial candidate detection module 60 includes a color space conversion module 66, a parametric thresholding module 68, and a connectivity-based segmentation module 70.

Initial candidate detection module 60 operates on the input image 12 in a color space that facilitates the segmentation of redeye color pixels from non-redeye pixels. In many cases the color distribution of actual redeyes appearing in an image of a person overlaps substantially with the color distribution of skin regions in the image of the person. The statistical distributions of redeye colors and skin colors in a collection of over a thousand sample redeye images has been analyzed in multiple color spaces to identify color spaces in which the distributions of redeye colors and skin colors may be more easily separated.

Figure 6A:
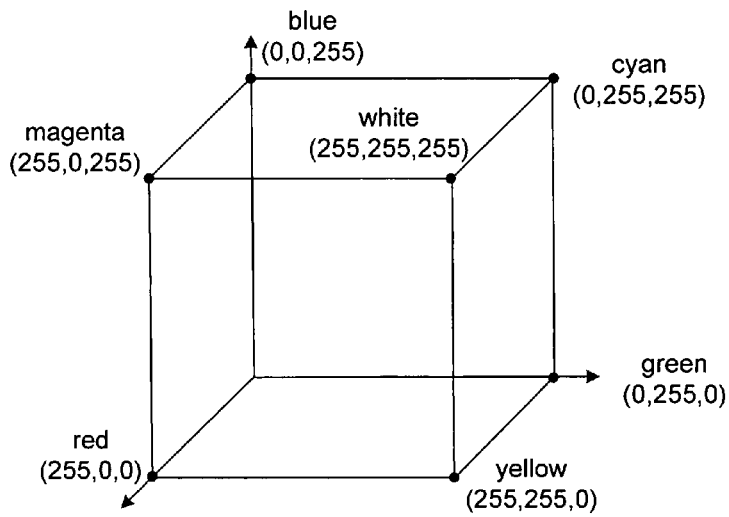
FIG. 6A is a three-dimensional plot of the red-green-blue (RGB) color space.
Figure 6B:
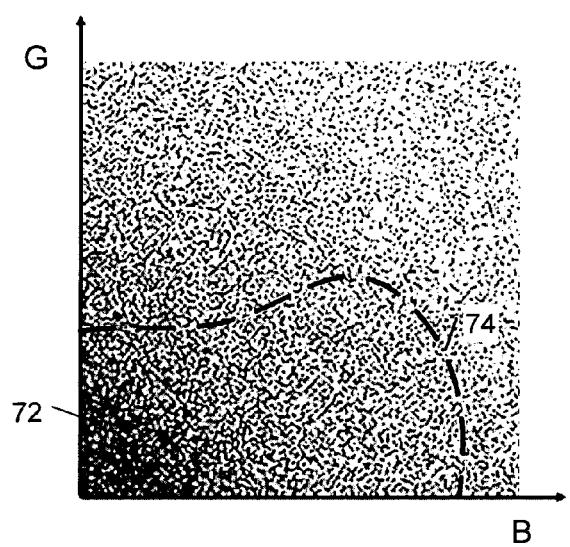
FIG. 6B is a two-dimensional plot of a green-blue plane of an RGB color space representation of an exemplary redeye pixel area.

Based on this analysis, it has been determined that the distribution of redeye colors in the RGB color space is sparse and not easily segmented. Referring to FIG. 6A, each pixel in the red-green-blue (RGB) color space is defined by red, green, and blue color values each of which may take on a value in the range of [0,255] and defines a plane intersecting a respective one of the red, green, and blue axes. FIG. 6B shows the distribution of colors for a sample redeye image in the green-blue plane of the RGB color space corresponding to a fixed red value of 100 (in the range of 0 to 255). In this G-B plane, the redeye colors are distributed from a relatively dense region 72 near the green axis to a sparsely distributed region near the far end of the blue axis within a region demarcated by the dashed line 74.

Figure 7A:
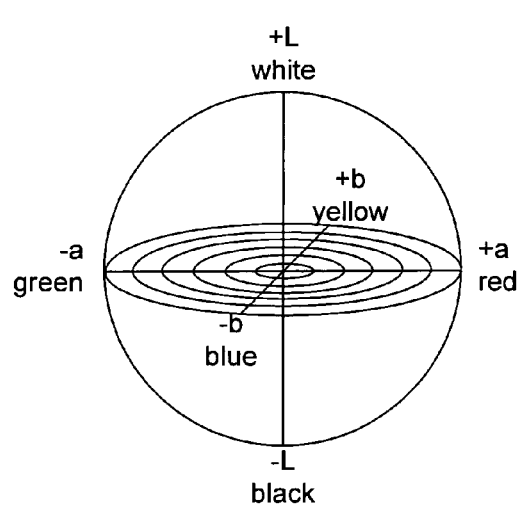
FIG. 7A is a three-dimensional plot of the CIE-Lab color space.
Figure 7B:
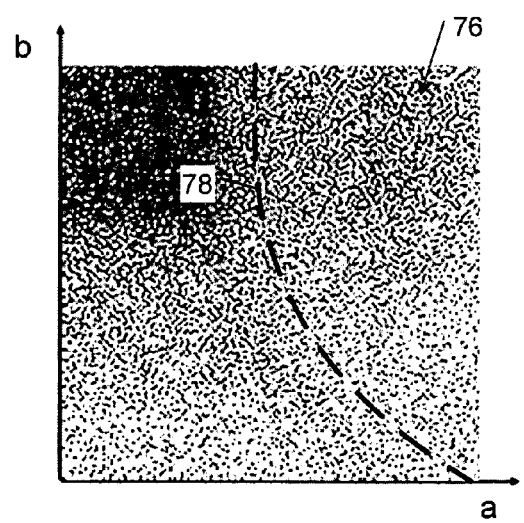
FIG. 7B is a two-dimensional plot of an ab plane of a CIE-Lab color space representation of an exemplary redeye pixel area.

The above-described redeye color distribution analysis has revealed that the distributions of redeye colors in certain other color spaces are more easily segmented than the redeye color distribution in the RGB space. For example, referring to FIG. 7A, the CIE-Lab color space is defined with respect to a white-black axis (L), a red-green axis (a), and a yellow-blue axis (b). FIG. 7B shows the distribution of colors for a sample redeye image in the a-b plane of the Lab color space corresponding to a fixed L value of 35 (in the range of 0 to 100). In this a-b plane, the redeye colors are densely distributed in the upper right hand corner region 76 demarcated by the dashed line 78. Thus, in the Lab color space, redeye colors may be more easily segmented from non-redeye colors than in the RGB color space.

Referring back to FIG. 5, if the input image 12 is not already represented in a suitable prescribed color space, color space conversion module 66 maps the color values of pixels in the input image 12 to the color values in the prescribed color space. In the embodiments illustrated herein, the prescribed color space is the CIE-Lab color space. In other embodiments, the prescribed color space may be, for example, a color space based on the YCbCr color space or the Luv color space.

Figure 8:
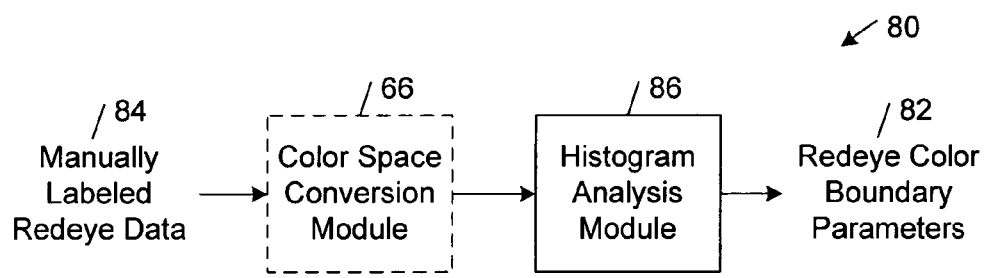
FIG. 8 is a block diagram of an embodiment of a system for generating redeye color boundary curves for segmenting redeye pixels in an input image.

The parametric thresholding module 68 segments redeye color pixels from non-redeye color pixels in the prescribed color space based on at least one predetermined redeye color boundary (or threshold) between redeye colors and non-redeye colors. FIG. 8 shows an embodiment of a system 80 for identifying is parameters 82 specifying a redeye color boundary for segmenting redeye colors from non-redeye colors in the prescribed color space. Initially, sample images of actual redeyes are manually labeled to generate sample data 84. The color space conversion module 66 maps the sample data 84 into the prescribed color space (if necessary). A histogram analysis module 86 analyzes the color distribution of the sample data in the prescribed color space to generate the redeye color boundary parameters 82. In some implementations, the redeye color boundary parameters 82 may be determined based on the application of a k-means vector quantization process (with k=2) to the manually labeled redeye data 84.

Ideally, the redeye color boundary corresponds to a multi-dimensional surface in the prescribed color space, which may have three or more dimensions depending on the number of color axes spanning the color space. For example, in the Lab color space, the redeye color boundary corresponds to a three-dimensional surface. In some implementations, the prescribed color space is quantized along one or more dimensions to generate a set of two-dimensional thresholding planes. Each thresholding plane contains a respective redeye color boundary (or threshold curve) corresponding to the redeye color boundary surface. In this way, the redeye color boundary surface is approximated by the set of redeye color boundary (or threshold) curves, which reduces the computational resources needed to segment redeye pixels from non-redeye pixels in the input image 12.

Figure 9:
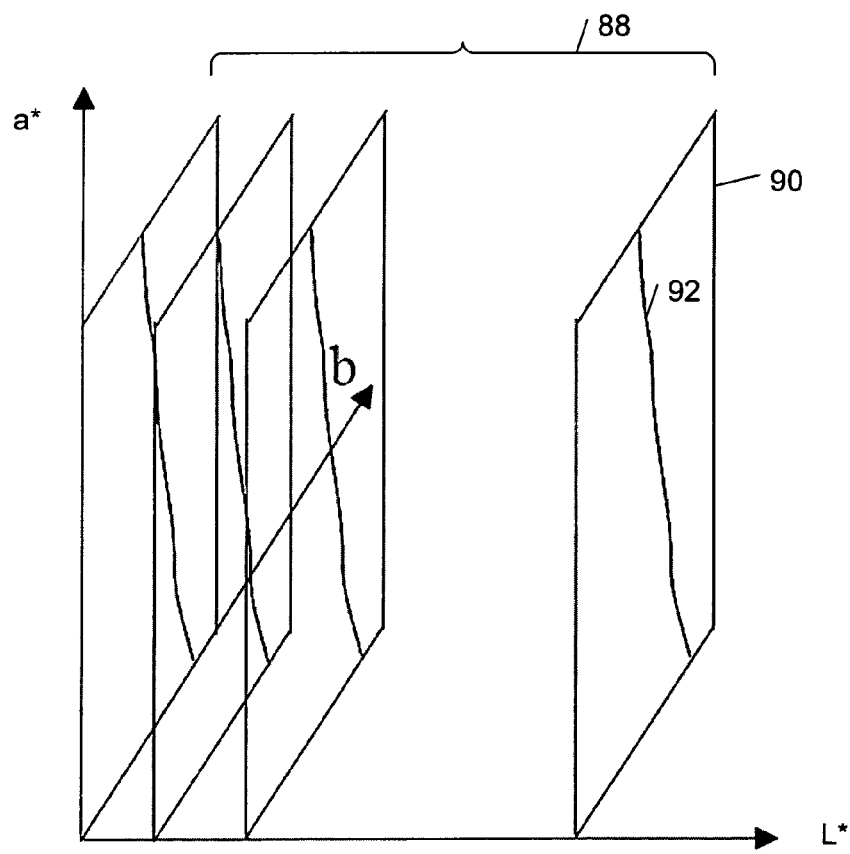
FIG. 9 is a three-dimensional plot of the CIE-Lab color space quantized along the L-axis into a set of thresholding planes each containing a respective redeye color boundary curve.
Figure 10:
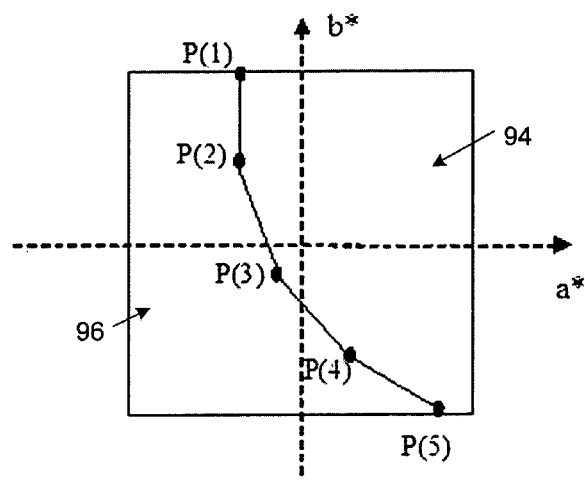
FIG. 10 is a two-dimensional plot of a polyline approximating a redeye color boundary curve in an a*b* plane of a modified CIE-Lab color space.

For example, FIG. 9 shows a three-dimensional plot of the CIE-Lab color space quantized along the L-axis into a set 88 of thresholding planes 90 each containing a respective threshold curve 92. In some embodiments, the L value is quantized uniformly into 10 bins. This quantization process turns a three-dimensional redeye color boundary surface in Lab space into ten two-dimensional boundary curves in respective a-b planes. As shown in FIG. 10, in some implementations, each two-dimensional boundary curve is further approximated by a group of line segments, which is represented and determined by an array of control points (P(1), P(2), . . . , P(5)). In the implementation illustrated in FIG. 10, the control points are defined with respect to a* and b* axes that correspond linearly shifted versions of the a and b axes in the standard CIE-Lab space, where the dynamic range of L* is [0,100] and the dynamic range of each of the a* and b* axes is [−128, 127]. The control point array separates the two-dimensional plane into two regions 94, 96. Pixels located within the upper right region 94 are classified as redeye pixels (e.g., a binarization output is set as one), and pixels located within the lower left region 96 are classified as non-redeye pixels (e.g., the binarization output is set to zero).

Figure 11A:
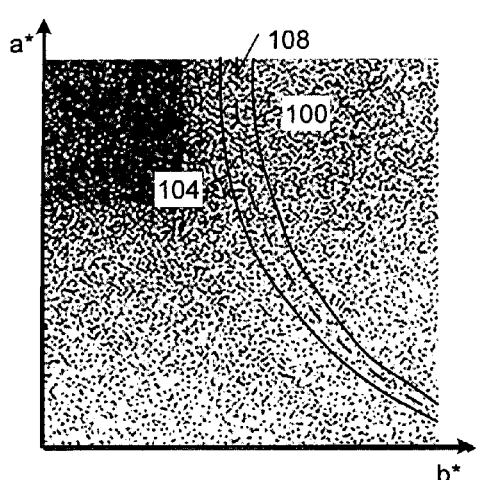
FIGS. 11A and 11B are plots of high contrast and low contrast redeye color boundary curves plotted in different a*b* planes of a CIE-Lab color space representation of an exemplary redeye pixel area.
Figure 11B:
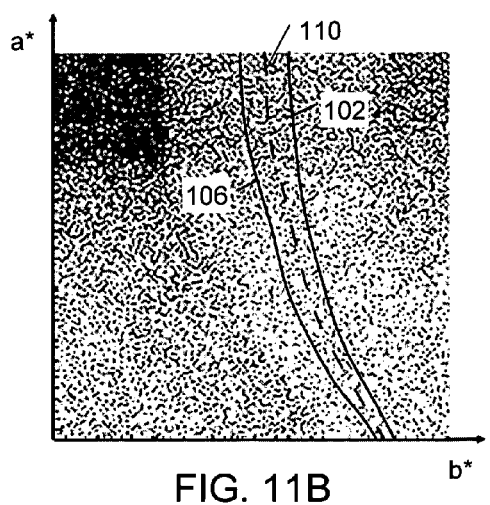

Referring to FIGS. 11A and 11B, in some implementations, the histogram analysis module 86 (FIG. 8) generates parameters specifying a high contrast redeye color boundary surface and a low contrast redeye color boundary surface, both of which are used to identify respective sets of redeye pixel areas in input image 12. FIGS. 11A and 11B are plots of high contrast curves 100, 102 and low contrast threshold curves 104, 106 plotted in different a*-b* planes of the L*a*b* color space representation of an exemplary redeye pixel area. In some embodiments, the high and low contrast redeye color boundaries are determined heuristically based on the redeye color boundary parameters 82 generated by histogram analysis module 86. In these embodiments, the redeye color boundary parameters 82 specify a basis set of boundary curves 108, 110 and the corresponding high and low contrast curves are generated by respectively shifting the boundary curves of the basis set toward and away from the upper right corners of the corresponding a*-b* planes by heuristically determined amounts.

The high contrast boundary curves 100, 102 are used to aggressively segment redeye color pixels from non-redeye color pixels, whereas the low contrast boundary curves 104, 106 are used to segment redeye color pixels less aggressively in order to accommodate cases in which the input image contains redeye pixels with colors that are somewhat merged with colors of non-redeye pixel areas (e.g., regions of pale or reddish skin). In this way, both high and low contrast redeye boundary curves may be used to identify all redeye pixels with a high likelihood. Although the set of pixels classified as redeye pixels is likely to be overly inclusive, the downstream segmentation and verification modules are designed to reject false alarms with high accuracy so that the final set of detected redeye pixel areas are highly likely to correspond to actual redeyes in the input image 12.

Control point arrays specifying respective threshold curves in the a*-b* planes for polylines approximating the high and low contrast redeye color boundary surfaces are contained in TABLE 1 and TABLE 2, respectively. In these implementations, each boundary surface is designed with respect to a L*a*b* color space, in which the dynamic range of L* is [0,100] and the dynamic range of a* and b* is [−128, 127]. These dynamic ranges are mapped from the standard CIE-Lab color space by applying a linear shifting factor to the standard Lab color values. Note the L* values for in each table represent the center values of each bin. In both TABLE 1 and TABLE 2, each row specifies an ordered ten-point control point array that represents a two-dimensional redeye boundary curve.

TABLE 1

High contrast binarization surface in L*a*b* space

| L* | Control points in (a*, b*) space | | | | | | | | | |
|---|---|---|---|---|---|---|---|---|---|---|
| 5  | (127, 12) | (96, 12) | (64, 12) | (32, 17) | (0, 17) | (−32, 37) | (−64, 70) | (−96, 103) | (−109, 127) |
| 15 | (127, 17) | (96, 17) | (64, 20) | (32, 20) | (0, 22) | (−32, 40) | (−64, 60) | (−96, 96)  | (−112, 127) |
| 25 | (127, 18) | (96, 19) | (64, 20) | (32, 22) | (0, 24) | (−32, 35) | (−64, 60) | (−96, 92)  | (−113, 127) |
| 35 | (127, 20) | (96, 20) | (64, 20) | (32, 23) | (0, 25) | (−32, 33) | (−64, 50) | (−96, 73)  | (−128, 127) |
| 45 | (127, 25) | (96, 20) | (64, 20) | (32, 25) | (0, 25) | (−32, 33) | (−64, 50) | (−96, 70)  | (−128, 100) |
| 55 | (127, 30) | (96, 30) | (64, 30) | (32, 27) | (0, 27) | (−32, 32) | (−64, 47) | (−96, 62)  | (−128, 90)  |
| 65 | (127, 30) | (96, 32) | (64, 30) | (32, 33) | (0, 30) | (−32, 35) | (−64, 43) | (−96, 60)  | (−128, 71)  |
| 75 | (127, 33) | (96, 33) | (64, 30) | (32, 33) | (0, 33) | (−32, 55) | (−64, 40) | (−96, 58)  | (−128, 65)  |
| 85 | (127, 45) | (96, 45) | (64, 53) | (32, 65) | (0, 33) | (−32, 60) | (−64, 40) | (−96, 58)  | (−128, 65)  |
| 95 | (127, 90) | (96, 90) | (64, 94) | (32, 93) | (0, 81) | (−32, 96) | (−64, 80) | (−96, 90)  | (−128, 111) |

TABLE 2

Low contrast binarization surface in L*a*b* space

| L* | Control points in (a*, b*) space | | | | | | | | | |
|---|---|---|---|---|---|---|---|---|---|---|
| 5  | (127, 12) | (96, 12) | (64, 12) | (32, 12) | (0, 12) | (−32, 30) | (−64, 70) | (−96, 103) | (−109, 127) |
| 15 | (127, 17) | (96, 17) | (64, 12) | (32, 12) | (0, 12) | (−32, 35) | (−64, 60) | (−96, 96)  | (−112, 127) |
| 25 | (127, 18) | (96, 19) | (64, 19) | (32, 16) | (0, 17) | (−32, 35) | (−64, 60) | (−96, 92)  | (−113, 127) |
| 35 | (127, 20) | (96, 20) | (64, 20) | (32, 17) | (0, 17) | (−32, 27) | (−64, 50) | (−96, 73)  | (−128, 127) |
| 45 | (127, 25) | (96, 20) | (64, 20) | (32, 20) | (0, 20) | (−32, 33) | (−64, 50) | (−96, 70)  | (−128, 100) |
| 55 | (127, 30) | (96, 30) | (64, 30) | (32, 20) | (0, 20) | (−32, 32) | (−64, 47) | (−96, 62)  | (−128, 90)  |
| 65 | (127, 30) | (96, 32) | (64, 30) | (32, 23) | (0, 25) | (−32, 35) | (−64, 43) | (−96, 60)  | (−128, 71)  |
| 75 | (127, 33) | (96, 33) | (64, 30) | (32, 25) | (0, 27) | (−32, 55) | (−64, 40) | (−96, 58)  | (−128, 65)  |
| 85 | (127, 45) | (96, 45) | (64, 53) | (32, 40) | (0, 40) | (−32, 60) | (−64, 40) | (−96, 58)  | (−128, 65)  |
| 95 | (127, 90) | (96, 90) | (64, 94) | (32, 93) | (0, 81) | (−32, 96) | (−64, 80) | (−96, 90)  | (−128, 111) |

Referring back to FIG. 5, in one exemplary embodiment, parametric thresholding module 68 segments redeye color pixels from non-redeye color pixels based on one or both of the predetermined high and low contrast redeye color boundary surfaces as follows. In this binarization process, the L*, a*, b* values of the current pixel of input image 12 to be binarized are computed and input into the parametric thresholding module 68. The L* axis is quantized by rounding the ratio L*/10 to a closest integer, which species the corresponding two-dimensional boundary curve in one or both of TABLE 1 or TABLE 2. The two-dimensional boundary curve corresponds to a group of line segments defined by a control point array in one of ten a*-b* planes. The boundary curve segments the a*-b* plane into two regions. If the (a*, b*) point for the current pixel is in the upper-right region (see, e.g., region 94 in FIG. 10), the pixel is labeled with "1" to indicate that it is a redeye pixel, otherwise it is labeled with a "0" to indicate that it is a non-redeye pixel.

After candidate redeye pixels have been identified by the parametric thresholding module 68, the connectivity-based segmentation module 70 segments the candidate redeye pixels into redeye and non-redeye classes based on pixel connectivity using any one of a wide variety of known pixel connectivity algorithms. Each pixel area that is segmented into the redeye class is labeled as a candidate redeye area. In the embodiments illustrated herein, each candidate redeye area is represented by a boundary rectangle (or box). In other embodiments, the candidate redeye pixel areas may be represented by non-rectangular shapes. In some embodiments, a number of fast heuristics are applied to the candidate redeye areas to eliminate false alarms. Known redeye pixel techniques may be used to eliminate false alarms (i.e., candidate redeye pixel areas that are not likely to correspond to actual redeye areas), including aspect ratio inspection and shape analysis techniques. For example, in some implementations, atypically elongated candidate redeye areas are removed.

Figure 12:
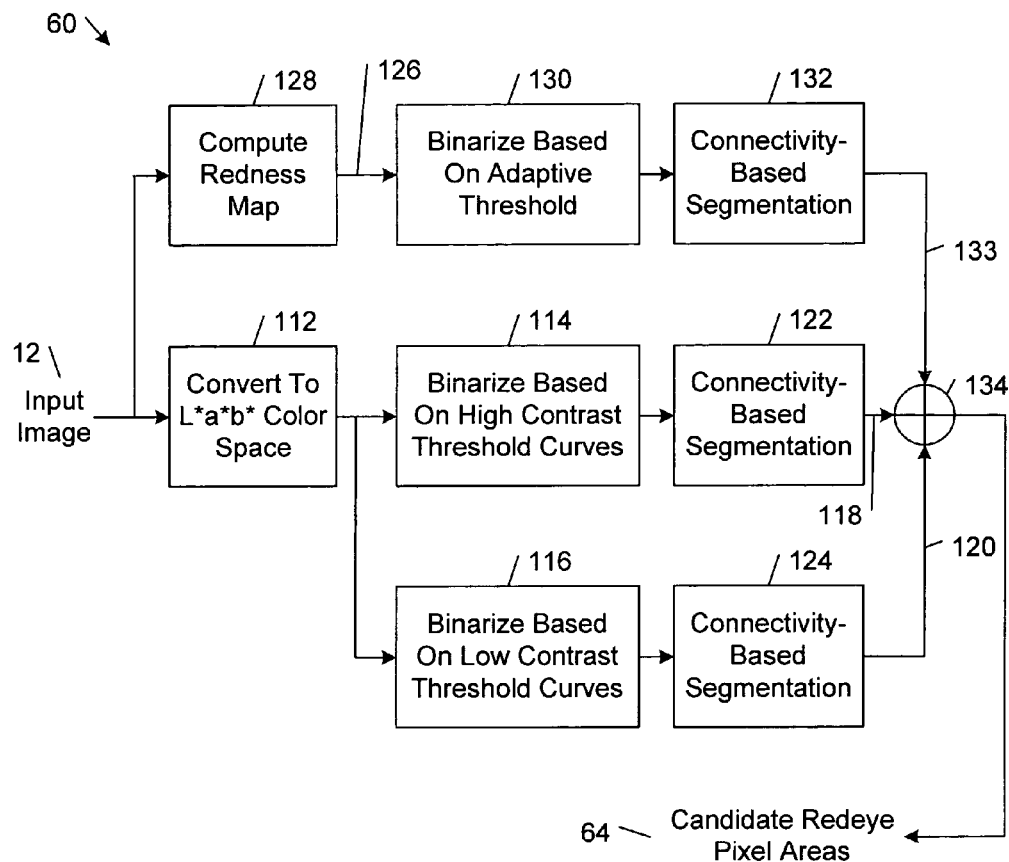
FIG. 12 is a flow diagram of a method of identifying initial redeye pixel areas in an input image.

Referring to FIG. 12, in some embodiments, the initial candidate detection module 60 is operable to identify candidate redeye pixel areas in the input image 12 based on multiple redeye color models as follows. Each redeye color model corresponds to a mapping of color values of input image pixels into a reference color space and a corresponding redeye color boundary for segmenting redeye pixels of the input image in the reference color space. In operation, initial candidate detection module 60 maps color values of input image pixels into reference color spaces corresponding to the different redeye color models, binarizes the converted input image based on the redeye color boundaries, and segments candidate redeye pixel areas based on connectivity.

In accordance with two redeye color models, the initial candidate detection module embodiment of FIG. 12 converts the input image 12 into the L*a*b* color space described above (step 112). The initial candidate detection module then binarizes the L*a*b* color space representation of the input image 12 based on the sets of high and low contrast threshold curves described above (steps 114, 116). Finally, the initial candidate detection module 60 segments initial sets 118, 120 of candidate redeye pixel areas from the binarized images (steps 122, 124).

In accordance with another redeye color model, the initial candidate detection module of FIG. 12 initially computes measures of pixel redness in the input image 12 to generate redness map 126 (step 128). Any one of a variety of different measures of pixel redness may be used to generate redness map 126 from input image 12. In some embodiments, the pixel redness measures are computed based on a ratio of a measure of a red component of pixel energy to a measure of total pixel energy. For example, in one implementation, pixel redness measures (R) are computed as follows:

$$R = \frac{\alpha \cdot r + \beta \cdot g + \gamma \cdot b}{r + g + b + d} \quad (1)$$

where r, g, and b are red, green, and blue component pixel values of input image 12, respectively, α, β and γ are weighting factors, and d is a prescribed constant with a value selected to avoid singularities and to give higher weights to bright pixels. In one exemplary implementation in which each of r, g, and b have values in the range of [0,255], α=204, β=−153, and γ=51, and d has a value of 1. Based on the mapping of equation (1), the redness of each pixel of input image 12 is mapped to a corresponding pixel of the redness map 126 having a redness value given by equation (1).

In other embodiments, redness map 126 may be computed using different measures of redness. For example, in one exemplary implementation, pixel redness measures (R0) for redness map 126 are computed as follows: R0=(255·r)/(r+g+b+d) when r>g, r>b; otherwise R0=0. Other representative redness measures (R1, R2, R3, R4) that may be used to compute redness map 126 are expressed in equations (2)-(5) below:

$$R1 = \frac{r^2}{(r+g+b+1)^2} \quad (2)$$

$$R2 = \frac{r^2}{(g+b)^2} \quad (3)$$

$$R3 = \frac{r+b}{(r+g+b+1)} \quad (4)$$

$$R4 = \frac{Cr}{(Cb+1)^2} \quad (5)$$

where r, g, and b are red, green, and blue component pixel values of input image 12, respectively, and Cr and Cb are the red and blue chrominance component pixel values of the input image 12 in the YCbCr color space.

Referring back to FIG. 12, initial candidate detection module 60 binarizes the redness map 126 (step 130). In some implementations, the redness map 126 is binarized by applying a linear adaptive threshold filter to the redness map 126. In one exemplary implementation, the value of each pixel on the redness map 126 is compared with the average of its neighboring pixels, where the neighborhood is defined as a square d×d pixel window, centered at the current pixel. The window size d is defined with respect to the original image size (h×w) as follows:

$$d = \min(h, w)/13 \quad (6)$$

where h and w are the height and width of the original input image. If the current pixel has higher redness value than its neighborhood average, the filter output is one (foreground); otherwise the output is zero (background).

In some implementations, an integral image representation is used to efficiently compute the pixel average within a sliding window. In particular, rectangle features may be computed very efficiently using an intermediate representation of the image which is referred as integral image. The integral image S(x, y) at location (x, y) contains the sum of the pixels above and to the left of (x, y), inclusive:

$$S(x, y) = \sum_{0 \leq \tilde{x} \leq x} \sum_{0 \leq \tilde{y} \leq y} I(\tilde{x}, \tilde{y}) \quad (7)$$

where I(x,y) is the original image.

Using the integral image, the sum of the pixels within an arbitrary rectangle may be computed as follows:

$$\text{sum}(x_1, y_1, x_2, y_2) = S(x_2, y_2) - S(x_2, y_1) - S(x_1, y_2) + S(x_1, y_1) \quad (8)$$

where $(x_1, y_1)$ and $(x_2, y_2)$ are the top left and bottom right corners of the rectangle. This way, the average of the pixels within an arbitrary rectangle can be efficiently obtained using three integer additions/subtractions and one division.

The output binary image from the filtering process is further processed by a pixel-connectivity-based object segmentation operation (step 132), which generates objects for all the foreground pixels. Each of the generated objects corresponds to a candidate redeye pixel area 133. As explained above, in the embodiments illustrated herein, each candidate redeye area is represented by a boundary rectangle (or box). In other embodiments, the candidate redeye pixel areas may be represented by non-rectangular shapes.

All of the candidate redeye pixel areas identified based on the different redeye color models are merged into the initial set 64 of candidate redeye pixel areas (step 134). The initial set 64 of candidate redeye pixel areas may, for example, correspond to the logical union of the different sets of candidate redeye pixel areas 118, 120, 133. It has been observed that the process of detecting redeyes using multiple redeye color models and merging the results frequently improves overall redeye detection accuracy.

C. Candidate Redeye Verification Module

As explained in detail below, candidate redeye verification module 62 (FIG. 4) classifies the candidate redeye pixel areas based on consideration of multiple features in parallel using a machine learning framework to verify that candidate redeye pixel areas correspond to actual redeyes in input image 12 with greater accuracy and greater efficiency.

Figure 13:
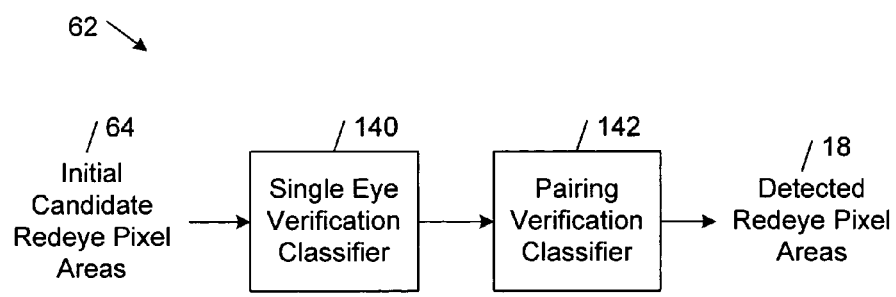
FIG. 13 is a block diagram of components of a candidate redeye verification module.

FIG. 13 shows an embodiment of candidate redeye verification module 62 that includes a single-eye verification classifier 140 and a pairing verification classifier 142. The single-eye verification classifier 140 filters candidate redeye pixels from the initial set 64 based on a projection of input image data into a feature space spanned by multiple features to generate feature vectors respectively representing the candidate redeye pixel areas 64 in the feature space. Candidate redeye pixel areas in the initial set 64 are filtered out based on the generated feature vectors. The pairing verification classifier 142 filters candidate redeye pixel areas remaining in the initial candidate set 64 after being filtered by the single-eye verification classifier to generate the set of detected redeye pixel areas 18. The pairing classifier 142 pairs the remaining candidate redeye pixel areas and filters out unpaired candidate redeye pixels areas based on a comparison of a reference statistical model with statistical models computed for candidate pairs of candidate redeye pixel areas.

1. Single-Eye Verification Classifier

Referring to FIG. 14, in some embodiments, a candidate redeye pixel area is filtered from the initial candidate set 64 by the single-eye verification classifier 140, as follows. Input image data is projected into a feature space in accordance with a set of feature definitions 144. Input image data includes any information relating to the input image 12, including color values of input image pixels, the locations of the candidate redeye pixel areas 64 in the input image 12, and other information derived from the input image needed to compute feature weights. Each feature is defined by a rule that described how to compute or measure a respective weight $(w_0, w_1, \ldots, w_N)$ for a candidate redeye pixel area that corresponds to the contribution of the feature to the representation of the candidate redeye pixel area in the feature space spanned by the set of features 144. The set of weights computed for a candidate redeye pixel area constitutes a feature vector 146. The feature vector 146 is input into a single-eye classification engine 148, which classifies the corresponding candidate redeye pixel area into a set 150 of candidate redeye pixel areas or a set 152 of false alarms.

FIG. 15 shows a diagram of information flow in an embodiment of a method of generating a feature vector 146 for a candidate redeye pixel area 64 in an implementation of the single-eye verification classifier 140. In this embodiment, some of the weights in the feature vector 146 are computed based on the application of feature templates 153 to respective feature planes 154, 156, 158.

A feature plane is any scalar image that is computed from input image data. In the embodiment illustrated in FIG. 15, the following feature planes are used to compute feature weights: a grayscale plane 154 corresponding to a grayscale representation of the input image data, a linear redness plane 156 corresponding to a redness representation of the input image data, and the a*-plane corresponding to a L*a*b* color space representation of the input image data. The grayscale plane 154 may be computed based on a typical grayscale transformation of the input image data. The redness plane 156 may be computed based on one of the redness measures described above in connection with the redness map 126 of FIG. 12. The a*-plane may be computed in accordance with the embodiments described above in section II.B.

A feature template specifies a rule for computing a feature weight based on regions of a feature plane. In some implementations, a feature template is defined by a pattern of basis regions and a scale factor, which specifies the scale of a central basis region relative to the size of a candidate redeye pixel area or to the size of an associated grayscale iris area, depending on the feature plane used to compute the feature weight. Additional parameters control the relative sizes of basis regions surrounding the central basis region.

To compute a feature weight, a feature template is scaled in accordance with the scale factor and centered with respect to a candidate redeye pixel area. The arrangement and types of basis regions determines how the feature weight is computed. For example, the basis regions of one type may specify the computation of a pixel value statistic over the corresponding regions of a feature plane that are added to the feature weight, whereas the basis regions of another type may specify the computation of a pixel value statistic over the corresponding regions of a feature plane that are subtracted from the feature weight. The computations for all of the basis regions are combined to produce a final value for the feature weight. Depending on the feature template definition, mathematical operations different from addition and subtraction may be used to compute the associated feature weight.

FIGS. 16A-16E show five exemplary circular contrast features for computing orientation-independent measurements of local contrast in a feature plane. Each circular contrast feature specifies a central basis region (highlighted light gray in FIGS. 16A-16E) with a basis region (highlighted dark gray in FIGS. 16A-16E) adjacent to the central basis region. In the illustrated embodiments, the central basis region corresponds to a square and the adjacent basis region corresponds to one or more squares. Although the central basis region square and the squares of the adjacent basis region are shown to have the same size in FIGS. 16A-16E, the central basis region square and the adjacent basis regions squares may have different sizes in other embodiments. Each of the circular contrast features is designed to compute the local contrast between the central basis region and its neighboring regions. In particular, a circular contrast template is scaled and centered in a first orientation over the location of a candidate redeye pixel area in a selected feature plane. The pixel value average in a feature plane region corresponding to the adjacent basis region is subtracted from the pixel value average in a feature plane region corresponding to the central basis region to obtain a first local contrast measurement. The circular contrast template is rotated to a second orientation and the pixel value average in the feature plane region corresponding to the new location of the adjacent basis region is subtracted from the pixel value average in the feature plane region corresponding to the central basis region to obtain a second local contrast measurement. The process is repeated for different orientations of the circular contrast template until the regions surrounding the central basis region have contributed evenly to the computation of the set of different feature weights.

FIG. 17 shows an exemplary set of eight rotational orientations of the circular contrast template of FIG. 16B that may be used to compute a set of eight different feature weights based on the circular contrast template and a selected feature plane. The set of computed feature weights is used to determine one or more representative feature weights of the feature vector 146. For example, in some implementations, one or both of the extrema (i.e., minimum and maximum values) in the set of feature weights computed for a given circular contrast template are selected as feature weights of the feature vector 146.

FIG. 16F shows an exemplary circular contrast feature template that is designed to compare two pairs of regions (i.e., paired regions 160, 162 and paired regions 164, 166), where the regions of each pair are located on opposite sides of a central region 168. This circular contrast template is designed to compute measurements of local orthogonal contrast in the vicinity of a candidate redeye pixel area. The contrast measurements may be computed for multiple rotational orientations of the circular contrast feature templates, and one or more of the computed measurements may be selected as a feature weight of the feature vector, as described above in connection with the circular templates of FIGS. 16A-16E.

FIGS. 18A and 18B show two exemplary concentric contrast feature templates for computing orientation-independent measurements of local contrast in a feature plane. Each concentric contrast feature specifies a central basis region 170, 174 (highlighted light gray in FIGS. 18A and 18B) and a basis region 172, 176 (highlighted dark gray in FIGS. 18A and 18B) concentrically surrounding the central basis region. The basis regions 170, 172 of the feature template of FIG. 18A are defined with respect to two concentric rectangles of the same shape: an inner basis rectangle and an outer surrounding rectangle. The basis regions 174, 176 of the feature vector of FIG. 18B are defined with respect to three rectangles of the same shape: an inner basis rectangle and two outer surrounding rectangles Each of the concentric contrast features is designed to compute the local contrast between the central basis region and its neighboring regions. In particular, a concentric contrast template is scaled and centered over the location of a candidate redeye pixel area in a selected feature plane. The pixel value average in a feature plane region corresponding to the surrounding basis region is subtracted from the pixel value average in a feature plane region corresponding to the central basis region to obtain a local contrast measurement corresponding to a feature weight of feature vector 146.

In one exemplary implementation, feature weights of feature vector 146 are computed using the following scale factor settings, assuming a central basis region of fixed size:

1) three features based on the concentric feature template of FIG. 18A are obtained by setting the outer rectangle to 2.25, 4, 6.25 times the size of the central basis rectangle, respectively.
2) three features based on the concentric feature template of FIG. 18B are obtained by setting the two outer rectangles to the following size pairs: (1.56, 2.25), (2.78, 4), (4.34, 6.25), assuming the base rectangle's size is 1.
3) two features are obtained for each of the circular templates of FIGS. 16A-16F by computing the minimal and maximal of the template weights computed for eight different rotational orientations of each the template.
4) three additional features are computed from the statistics of the pixels located within the central basis region; namely, the average, the dynamic range (i.e., minimum pixel value–maximum pixel value), and the standard deviation of pixel values.

In this implementation, twenty-one feature weights are computed based on the above set of feature templates and scale factors.

Computing Grayscale Features

Grayscale features are computed based on application of feature templates to the grayscale plane 154 (FIG. 15).

Referring to FIGS. 19A and 19B, the scale of grayscale features for a candidate redeye pixel area is determined based on a measure of the size of the iris corresponding to the candidate redeye pixel area. In some embodiments, a candidate redeye pixel area is represented by a rectangle 180 and the associated iris is represented as a square 182. The iris is assumed to share the same center with the candidate redeye pixel area 180. Note that each candidate redeye area 180 is not necessarily identical to its associated grayscale iris area 182. The square grayscale iris area 182 is computed over a grayscale plane using the following search algorithm. Initially, a grayscale map is computed by mapping the pixels of input image 12 in accordance with a grayscale mapping G, given by G=MIN(G1, G2), where MIN is a function that outputs the minimum of G1 and G2, which are given by:

$$G1 = 0.299 \times r + 0.587 \times g + 0.114 \times b \quad (9)$$

$$G2 = 0.299 \times (255-r) + 0.587 \times g + 0.114 \times b \quad (10)$$

where r, g and b are red, green and blue values for each pixel within the region and the grayscale values are obtained for each pixel and averaged over the region. In this grayscale mapping, G1 is a standard grayscale mapping computed from (r, g, b), whereas G2 is the grayscale mapping computed from (255-r, g, b). The grayscale mapping G2 handles instances of "glowing" redeyes (i.e., when a redeye are appears much brighter than its surroundings). In accordance with the above approach, such atypical "glowing" redeyes are mapped to a grayscale channel that allows them to be treated in the same way as typical redeyes.

A known search technique is performed over the computed grayscale map to locate one or more areas corresponding to irises. In this search algorithm design, it is assumed that the iris area 182 shares the same center with its candidate redeye area 180. The size of the iris area 182 is determined based on a comparison of a candidate square box (box 8 in FIG. 19B) with each of its eight nearest neighbors (boxes 0-7 in FIG. 19B). In one implementation, an initial area that encompasses the surrounding areas 0-7 is partitioned into nine equal-sized nearest neighbor boxes (numbered 0-9). The size of the final optimal grayscale box 182 (or square) is determined by selecting a size that maximizes the grayscale contrast between the center box (box 8) and its surrounding neighbors (boxes 0-7). In this search process, only one variable is involved: the side length of the center box. In one implementation, a brute force search technique is used to determine the final size of grayscale iris area 182.

After the grayscale iris box has been computed, the grayscale features are computed by aligning feature templates with respect to the grayscale box. In one implementation, the feature templates are aligned with a candidate redeye pixel area such that their central basis regions have the same shape as the grayscale iris box 182 and share that same center with the grayscale iris box 182. In this implementation, each template is scaled to 0.69, 1, and 1.44 times the size of the grayscale box to generate 3×21=63 grayscale features for each candidate redeye pixel area.

Computing Color Features

Color features are computed based on application of feature templates 153 to the linear redness plane 156 and the a*-plane 158 (FIG. 15). In some implementations, the scale information for computing color features is obtained directly from the candidate redeye pixel areas. The color features are computed by aligning feature templates with respect to the candidate redeye pixel areas. In one exemplary implementation, the central basis region of each feature template is centered with respect to a candidate redeye pixel area and has the same shape are the candidate redeye pixel area. In this implementation, the size of the templates are scaled to 0.69, 1, and 1.44 times the size of the candidate redeye pixel area to generate 3×21×2=126 color features for each candidate redeye pixel area computed on linear redness plane 156 and the a*-plane 158.

Computing Other Features

In addition to the above-described grayscale and color features, other features, which are based on semantics different from feature templates 153, are computed. In some implementations, features based on one or more of the following measurements are computed and included in the feature vector 146: the aspect ratio of a candidate redeye pixel area; and the percentage of pixels classified as skin tone pixels in the neighborhood of the grayscale iris area 182 computed for the candidate redeye pixel area, where the neighborhood corresponds to the regions corresponding to the eight neighboring rectangles that have the same shape and size of the grayscale box 182 (see FIG. 19B). Any skin tone classification technique may be used to classify pixels of input image 12.

Training the Single-eye Classification Engine

Referring to FIG. 20, in some implementations, the single-eye classification engine 148 (FIG. 14) is trained as follows. Training images 190 are first processed by the initial candidate detection module 60 (FIG. 4) to generate an initial set of candidate redeye pixel areas 192. Each candidate redeye pixel area is labeled manually by a human expert (or administrator) as corresponding to a red eye pixel area (positive sample) or a non-redeye pixel area (negative sample) (step 194). Feature vectors are computed for both positive and negative samples (steps 196, 198). The resulting training data 200, 202 are sent to a machine learning model 204 to train the final classifier 148. In some implementations, the machine learning model 204 is operable to simultaneously select features and train the classifier. In one exemplary implementation, the machine learning model 204 is based on Adaboost machine learning technology (see, e.g., Y. Freund and R. Schapire, "A short introduction to boosting", J. of Japanese Society for AI, pp. 771-780, 1999, which is incorporated herein by reference).

In the above-described machine learning framework, the feature computation function, which generates positive and negative feature vectors 196, 198 for each candidate redeye pixel area, corresponds to the feature weight computation scheme described above in connection with FIGS. 15-19B. In this design, however, instead of explicitly finding the features that are to be used to train the classifier, larger (or overly inclusive) feature set is used initially. In general, this feature set may include any features that may be relevant to the problem of distinguishing redeye pixel areas from non-redeye pixel areas, and the set of features may be much larger than the set used for training the single-eye classification engine 148. The selection of features that are actually used in the single-eye classification engine 148 is delayed into the machine learning process.

Given a feature set design, the Adaboost based machine learning model simultaneously performs feature selection and classifier training. FIG. 20 illustrates the high level framework of the training design. A detailed training procedure for one implementation is described below.

First, a set of simple classifiers $h_j(x)$ is defined over the whole feature set where $h_j(x)$ can be described using a feature function $f_j(.)$, a threshold $\theta_j$, and a parity $p_j$:

$$h_j(x) = \begin{cases} 1 & \text{if } p_j f_j(x) > p_j \theta_j \\ 0 & \text{otherwise} \end{cases} \quad (11)$$

where x represents the image data of a candidate redeye pixel area, and $f_j(x)$ is a feature function that computes the j-th feature of the total feature set described above in connection with FIGS. 15-19B.

A detailed training procedure for training the Adaboost-based machine learning model procedure is described in TABLE 3 below. Note in TABLE 3, T iterations of boosting operation are repeated. In each iteration, $$h_j^{(t)}(x)$$

is optimized individually for each feature (the j-th feature, j=1, 2, . . . , s, where s is the total number of features in the feature set) to minimize the classification error (defined using the current weight $$w_i^{(t)},$$

where (t) denotes the t-th iteration, and i denotes the i-th training sample). The boosting classifier $H^{(t)}(.)$ is assigned to be the $$h_j^{(t)}(x)$$

classifier that produces the minimal classification error. The weights of training samples $$(w_i^{(t)})$$

are updated based on whether the corresponding training sample is corrected classified by the classifier $H^{(t)}(.)$. In one exemplary implementation, twenty-five Adaboost iterations are used in the training process, and the final classifier is used for single-eye verification.

TABLE 3

Adaboost Training Process

Input:

Given training feature vectors $(x_1, y_1), \ldots, (x_n, y_n)$
where $y_i = 0, 1$ for negative and positive examples respectively.
Boosting Algorithm:

(1) Initialize weights $w_i^{(0)} = 1/(2m), 1/(2l)$ for $y_i = 0, 1$ respectively, where m and l are the number of negative and positive examples respectively.

(2) For $t = 1, \ldots, T$;

(2.1) Normalize weights: $w_i^{(t)} = w_i^{(t-1)} / \left( \sum_{k=1}^{n} w_k^{(t-1)} \right)$.

(2.2) For each feature j, train a classifier $h_j^{(t)}()$ that is restricted to using a single feature that minimizes the classification error $e_j^{(t)} = \sum_i w_j^{(t)} |h_j(x_i) - y_i|$.

(2.3) Choose the weaker learner function as the $h_j^{(t)}$ with the lowest error $e_t$, e.g., $H^{(t)}() = h_{j0}^{(t)}()$, where $j_0 = \arg \min_j (e_j)$.

(2.4) Update the weights: $w_i^{(t)} = w_i^{(t)} \beta_t^{1-\epsilon_i}$, where $\epsilon_i = 0$ if example $x_i$ is classified correctly; $\epsilon_i = 1$ otherwise, and $$\beta_t = \frac{\epsilon_t}{1 - e_t}.$$

Output:

The final classifier is:

$$H(x) = \begin{cases} 1 & \sum_{t=1}^{T} \alpha_t H^{(t)}(x) > 0.5 \sum_{t=1}^{T} \alpha_t \\ 0 & \text{otherwise} \end{cases}$$

where $\alpha_t = -\log \beta_t$.

2. Pairing Verification Classifier

Referring back to FIG. 13, after the above-described single-eye verification classifier 140 has filtered non-redeye pixel areas from the set of initial redeye candidate redeye pixel areas, the remaining candidate redeye pixel areas are likely to correspond to the approximate location and size of actual redeye areas in input image 12. In the embodiment of FIG. 13, redeye detection module 62 applies a pairing verification classifier 142 to further filter candidate redeye pixel areas from the initial set of candidate redeye pixel areas.

In some implementations, the pairing verification classifier 142 is designed using a machine learning method, similar to the way that the single-eye verification classifier 140 is designed. In these implementations, each pair of candidates is classified into two classes: (1) a pair of redeye pixel areas; and (2) others. For each candidate pair of redeye pixel areas, a feature vector is computed. Both heuristic and non-heuristic features are included in the feature set that forms the feature vector. The following features are designed based on heuristics:

Size feature: measures the size difference of the two redeye candidates. This includes the comparison of iris sizes as well as redness box sizes.

Distance feature: measures the distance between two redeye candidates, which should not be too small or too big as compared to size of the two candidates.

Grayscale feature: measures the grayscale difference of the two redeye candidates.

Color feature: measures the color difference of the two redeye candidates (e.g., by computing the color vector distance between the average colors of the two redeye candidates).

Figure 21:
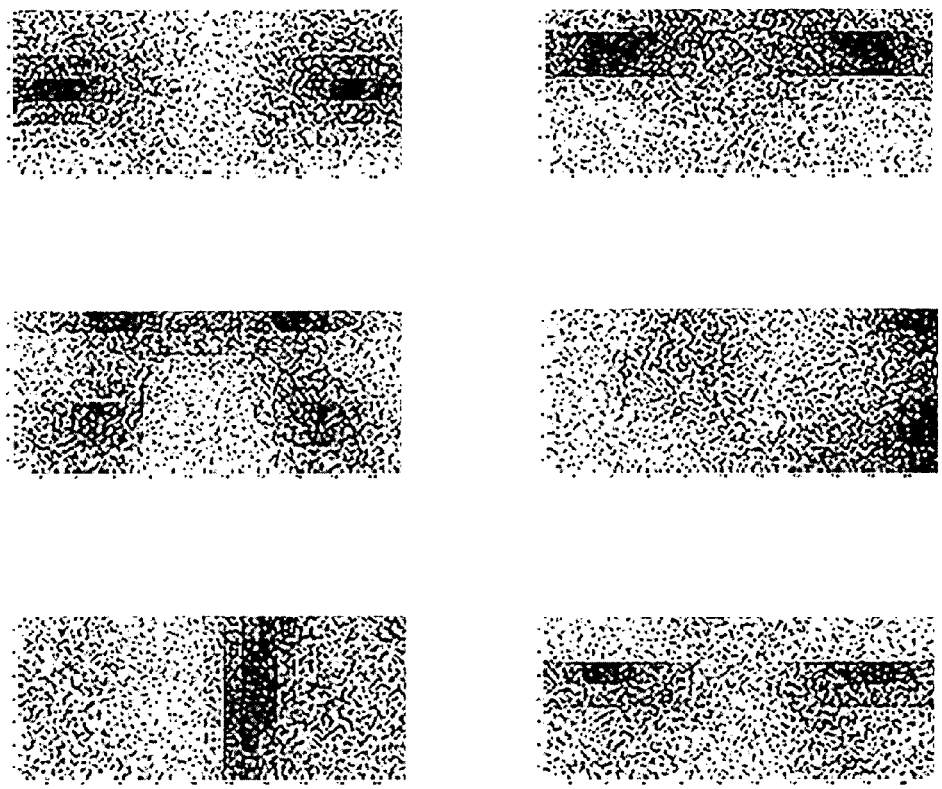
FIG. 21 shows a set of eigen-images corresponding to exemplary eye pair reference texture patterns.

In addition to heuristic features, statistical features also are used for feature vector computation. In some embodiments, statistical features are computed to represent the grayscale appearance of the eye pair regions. In this approach, only a small region containing a candidate pair of redeye pixel areas is considered, the remaining image areas are not used in the feature vector calculations. In the training stage, each valid eye pair region in a set of training images is cropped, rotated and scaled to a standard size of 7 pixels by 21 pixels. The cropped image patch is further histogram-normalized, and the pixel values are stacked up to form a grayscale feature vector of 147 components. The distribution of the feature vectors of training patterns is modeled as a Gaussian distribution. A PCA (Principle Component Analysis) is used to decompose the feature space into a low-dimension subspace spanned by the first few eigenvectors, and a subspace orthogonal to the eigenvector subspace. Exemplary eigenvectors (or eigen-images) obtained from the PCA are shown in FIG. 21.

Figure 22A:
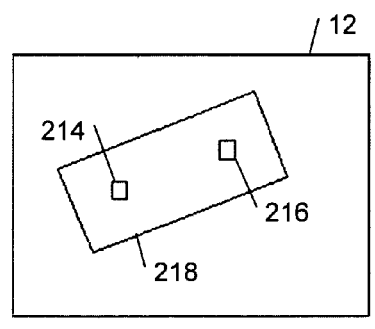
FIG. 22A is a diagrammatic view of a candidate redeye pair region detected in an input image.

During the pair matching verification process, the pair matching classifier 142 identifies the neighborhood region 218 (FIG. 22A) in input image 12 based on the candidate redeye pixel areas received from the single-eye verification classifier 140. The region of the input image 12 corresponding to the computed neighborhood region 218 in the grayscale channel is cropped, scaled and rotated, and normalized as in the training stage. In one implementation, the candidate pair region size is 21 pixels by 7 pixels. This generates a grayscale feature vector of 147 components. In one implementation, two distance features are computed to measure the similarity of a candidate pair of redeye pixel areas to the trained reference eye pair pattern: (1) a distance within the low-dimension eigenvectors space; and (2) a distance from the low-dimension eigenvector space. See, for example, K.-K. Sung, "Learning and example selection for object and pattern detection," Ph.D. thesis, MIT AI lab, 1996, which is incorporated herein by reference. Because both of the distance features are scalars, they can be combined easily with the above-described heuristic features to form a feature set.

Given a feature set definition, the pair verification classifier 142 is designed in the same way the single-eye verification classifier 140 is designed (see, e.g., the training method of FIG. 20 and the verification method of FIG. 14). In the case of the pair verification classifier 142, candidate pairs of redeye pixel areas are inputs and the features are the heuristic and statistical features described in this section of the disclosure. In some implementations, an AdaBoost machine learning training process is used to train an efficient classifier for pair verification.

III. Redeye Correction

A. Mapping Detected Redeye Pixels

Figure 25:
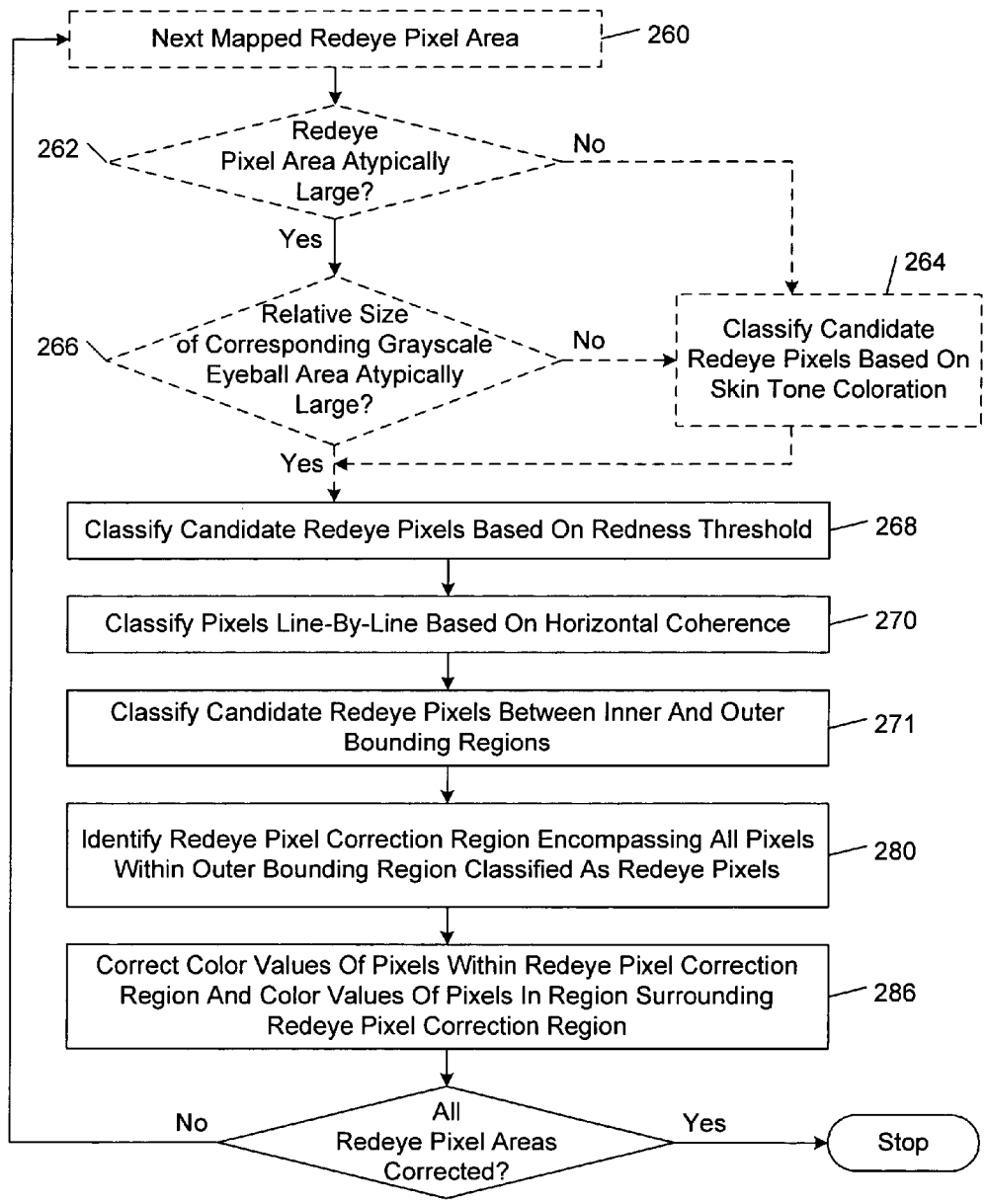
FIG. 25 is a flow diagram of a method of segmenting and correcting redeye pixels in a digital image.

FIG. 25 shows an embodiment of a method of correcting redeye in input image 12 based on the redeye pixel areas 18 detected by redeye detection module 14. In this embodiment, if redeye pixel areas are detected based on a thumbnail 44 of the input image, the detected redeye pixel areas 18 and the associated grayscale iris pixel areas 182 (FIG. 19A) are mapped to a prescribed output resolution (block 250). For example, in the printer system application environment of FIG. 2, the detected redeye pixel areas 18 and the associated grayscale iris pixel areas 182 are mapped from the resolution of thumbnail image 44 to the output resolution at which printer system 30 will produce image 20. In general, the output resolution of printer system 30 depends on the selected print mode (e.g., "draft" print quality, "normal" print quality, and "high" print quality) and the selected size of the media on which image 20 will be printed. For example, assuming image 20 is to be printed on a 4-inch by 6-inch piece of photo paper at a printer resolution of 300 dpi (dots per inch), the detected redeye pixel areas 18 and the associated grayscale iris pixel areas 182 are scaled up from a thumbnail size of 384 pixels in width by 288 pixels in height to a print image size of 1800 pixels in width by 1200 pixels in height.

In some implementations, the mapped detected redeye pixel areas are enlarged to compensate for errors that might occur as a result of the inaccuracy inherent in the quantization processes involved in mapping areas from the resolution of the thumbnail image 44 to the output resolution. In these implementations, the horizontal dimension and the vertical dimension of the mapped redeye pixel areas are enlarged independently by an enlargement amount that decreases with the original horizontal and vertical dimension of the mapped redeye pixel areas. For example, in one implementation, the dimensions of the mapped redeye pixel areas are enlarged as follows:

200%, if the original mapped dimension size is 1 pixel;
100%, if the original mapped dimension size is 2 pixels;
40%, if the original mapped dimension size is 3 pixels;
20%, if the original mapped dimension size is 4 to 10 pixels; and
5%, if the original mapped dimension size is above 10 pixels.

Figure 26A:
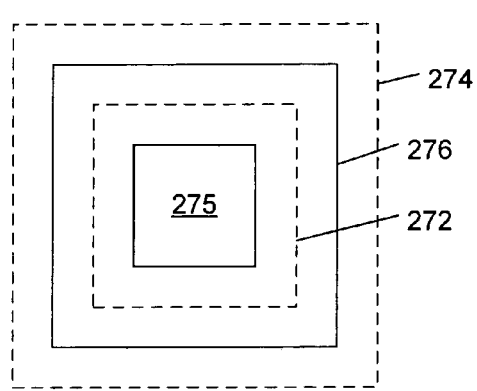
FIG. 26A shows inner and outer bounding regions derived from a mapped redeye pixel area and a corresponding mapped grayscale iris pixel area.
Figure 26B:
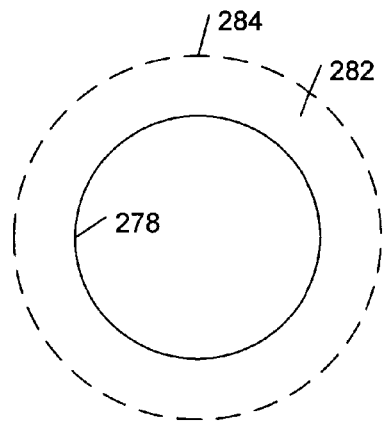
FIG. 26B shows inner and outer redeye pixel corrections regions used in an embodiment of a method of correcting redeye in a digital image.

As shown in FIG. 26, in some implementations, the corners of the enlarged mapped redeye pixel areas 251 are cropped to form an octagonal shape that approximates the oval shape typical of human eye pupils. The amount by which the corners are cropped is empirically determined. In one exemplary illustration, the side dimension of each corner region corresponds to 15% of the corresponding side (horizontal or vertical) dimension of the enlarged mapped redeye pixel area 251.

B. Classifying Redeye Pixels

Figure 22B:
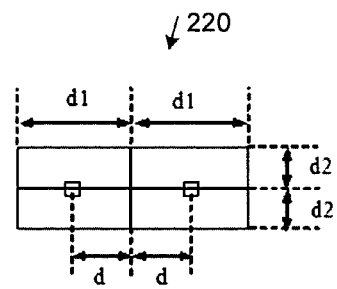
FIG. 22B is a diagrammatic view of a standardized candidate redeye pair template.
Figure 23:
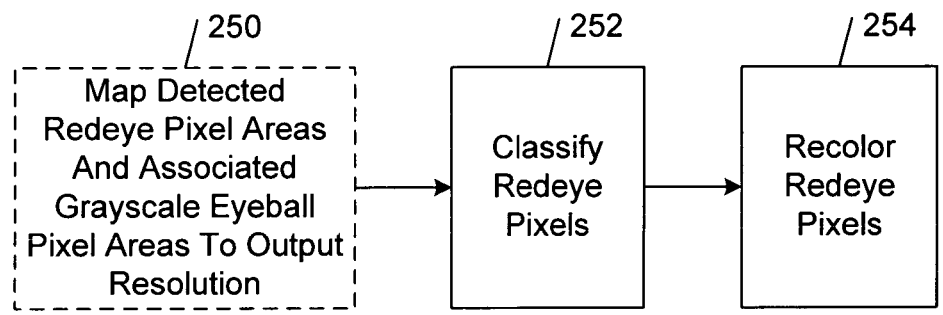
FIG. 23 is a flow diagram of an embodiment of a method of correcting detected redeye pixels.
Figure 24:
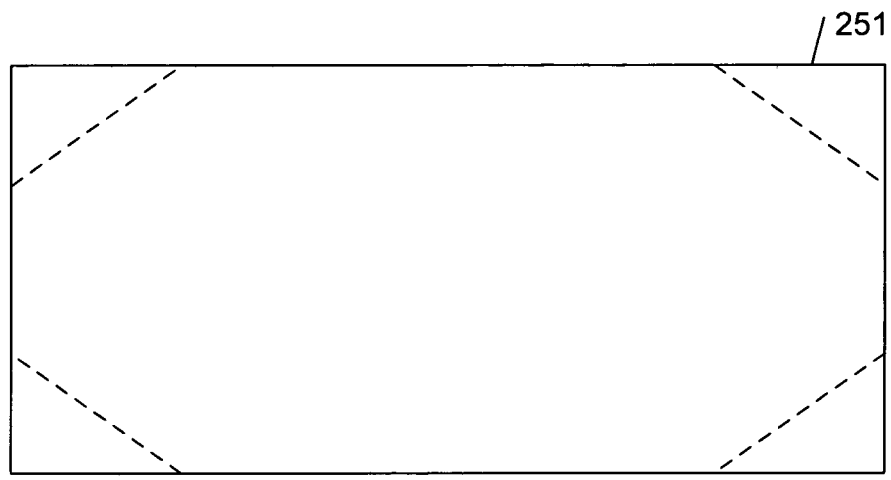
FIG. 24 shows a detected redeye pixel area mapped to an output image resolution showing cropping lines for corner regions.

Referring back to FIG. 22, after the detected redeye pixel areas and the associated grayscale iris pixel areas have been mapped to the output resolution (and optionally enlarged and cropped), if necessary, the pixels in the resulting mapped redeye pixel areas 251 are classified as redeye pixels and non-redeye pixels (block 252). If redeye pixel areas a detected directly from input image 12, the mapping step 250 is skipped and the detected redeye pixel areas are classified directly (step 252). In some embodiments, each pixel within the detected redeye pixel areas is classified independently of the other redeye pixel areas. In these embodiments, pixel classification also is performed per pixel and per pixel line without any reference to (or coherence with) adjacent (above or below) pixel lines.

Figure 27:
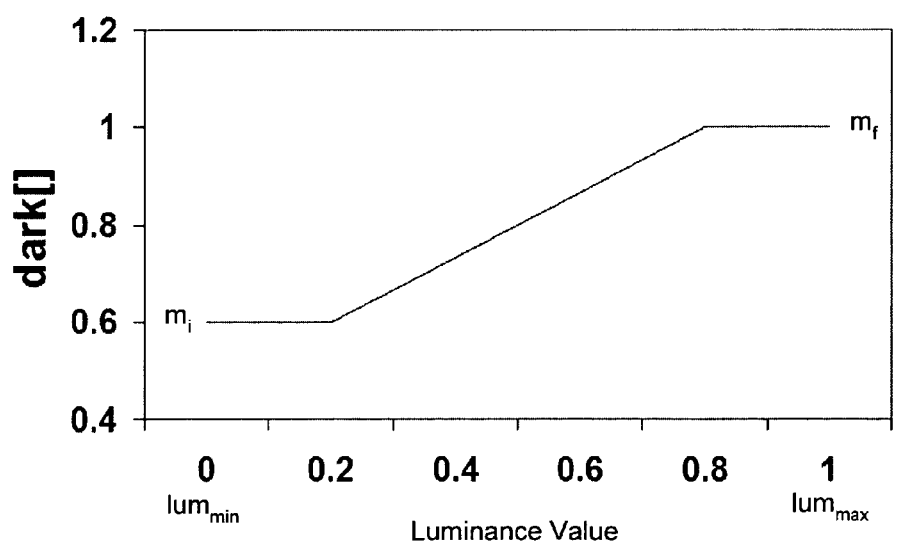
FIG. 27 is a graph of darkening factors plotted as a function of a green color component value of a pixel of an input image.

FIG. 27 shows an embodiment of a process of classifying redeye pixels in the detected redeye pixel areas.

For each mapped redeye pixel area 251 (step 260), if the mapped redeye pixel area is not atypically large (step 262), pixels in the mapped redeye pixel area are classified as candidate redeye pixels based on skin tone coloration (step 264). In one implementation, a mapped redeye pixel area 251 is considered to be atypically large if any dimension (e.g., width or height) is larger than 10 pixels. If the redeye pixel area 251 is atypically large (step 262) but the size of the corresponding grayscale iris area relative to the mapped redeye pixel area is not atypically large (step 266), then pixels in the mapped redeye pixel area also are classified as candidate redeye pixels based on skin tone coloration (step 264). In one implementation, a mapped grayscale iris area is considered to be atypically large if its is 50% larger than its corresponding mapped redeye pixel area 251. In the skin tone classification process, pixels in the input image 12 are classified as corresponding to either a skin tone area or a non-skin tone area using any type of skin tone classification or segmentation technique.

If the mapped redeye pixel area 251 is atypically large (step 262) and the size of the corresponding grayscale iris area relative to the mapped redeye pixel area is atypically large (step 266), then it is assumed that the mapped redeye pixel area 251 is completely separated from the eyelid and surrounding skin tone regions of a person's face. In this case, the skin-tone-coloration-based pixel classification step (step 264) is omitted for the mapped redeye pixel area 251 being processed.

Candidate redeye pixels in the detected redeye pixel areas are classified based on a pixel-based redness classification process (step 268). In one implementation, candidate redeye pixels in input image 12 having color components satisfying the following criteria are classified as candidate redeye pixels, and other candidate redeye pixels are filtered from the candidate set:

$Cr > 128,$ $Cr > Cb,$ and (20)

$Cr > Y,$ where Cr, Cb and Y are the color components of the input image pixels represented in the YCbCr color space.

After pixels in a detected redeye pixel area have been classified based on a redness threshold (step 268), candidate redeye pixels are classified line-by-line based on horizontal coherence (step 270). For example, in one implementation, if a given candidate redeye pixel is located adjacent to a pixel previously classified as a candidate redeye pixel and has a redness value greater than an empirically determined threshold, then the given pixel also is classified as a candidate redeye pixel.

Referring to FIGS. 27, 28A, and 28B, pixels located between an inner bounding region 272 and an outer bounding region 274 are classified as red or non-red pixels based on the above described redness and skin tone classification steps and based on a grayscale threshold (step 271).

The inner bounding region 272 is centered at the center of the detected redeye pixel area 275 being processed and has dimensions (e.g., width and height) that correspond to the average of the dimensions of the detected redeye pixel area 275 and its corresponding grayscale iris area 276. The outer bounding region 274 also is centered at the center of the detected redeye pixel area 275. In one implementation, the dimensions of the outer bounding region 274 are 50% larger than the corresponding dimensions of the inner bounding region 272 if the inner bounding region 272 is larger than two pixels; otherwise, the dimensions of the outer bounding region 274 are 200% larger than the corresponding dimensions of the inner bounding region 272.

In addition to redness and skin tone coloration, pixels between the inner and outer bounding regions 272, 274 are classified based on application of a grayscale threshold to the grayscale values of the pixels as follows. In some implementations the green channel in RGB color space is used to approximate the grayscale values of pixels. In one implementation, the applied grayscale threshold corresponds to the average of the average of the grayscale values within the inner bounding region 272 and the average of the grayscale values between the inner and outer bounding regions 272, 274. For example, if the average of the gray values within the inner bounding region 272 is 90 and the average of the gray values outside the inner bounding region 272 but within the outer bounding region is 274, then the average gray value 105 ((90+120)/2) is the grayscale threshold used to segment the pixels between the inner and outer bounding regions 272, 274. Pixels between the inner and outer bounding regions 272, 274 having grayscale values below the computed grayscale threshold are classified as candidate redeye pixels.

All candidate redeye pixels within the outer bounding region 274 are classified as redeye pixels based on connectivity, with stringent requirements to remove fragments, outliers, and noise. Referring to FIG. 28B, a redeye pixel correction region 278 that encompasses (or encircles) all pixels within the outer bounding region 274 classified as redeye pixels is identified (step 280). In some implementations, the redeye pixel correction region 278 has an elliptical shape. In the illustrated example, the redeye pixel correction region 278 has a circular shape. In addition to the redeye pixel correction region 278, a redeye pixel smoothing region 282 surrounding the redeye pixel correction region 278 is computed. In the example illustrated in FIG. 28B, the redeye pixel smoothing region 282 is defined by a circular boundary 284 that is concentric with the redeye pixel correction region 278 and has a radius that is 50% larger than the radius of the redeye pixel correction region 278.

C. Re-Coloring Redeye Pixels

Referring back to FIG. 27, after the classified redeye pixels have been classified, the pixels in the mapped redeye pixel areas classified as redeye pixels are re-colored (step 286). Redeye pixels in the redeye pixel correction region 278 are corrected by desaturating and darkening the original color values as described in detail below. The original color values of redeye pixels in the redeye pixel smoothing region 282 are corrected in a similar way, except that the relative amount of correction varies from 90% at the boundary with the redeye pixel correction region 278 to 20% at the boundary 284 of the redeye pixel smoothing region 282. This smoothing or feathering process reduces the formation of disjoint edges in the vicinity of the corrected redeyes in the corrected image.

Initially, color correction darkening factors and weights are computed for the redeye pixels to be corrected. The darkening factors and weights indicate how strongly original color values of redeye pixels are to be desaturated (i.e., pushed towards neutral or gray values). As explained in detail below, these two factors vary with pixel location relative to the center of the redeye pixel correction region 278 to give a smooth transition between the pixels in the input image 12 that are changed and those that are not to avoid artifacts.

The darkening factors are computed based on luminance (or gray) values of the input image pixels. In one implementation, the darkening factors are computed based on the graph shown in FIG. 29, where the luminance (or gray) level of each redeye pixel is assumed to vary over a range of $[lum_{min}, lum_{max}]=[0, 1]$. In one implementation, the green color channel is used to estimate luminance values. Other implementations may use different estimates or measures of luminance values. In the illustrated implementation, the minimum darkening factor ($m_i$) is set to 0.6 and the maximum darkening factor ($m_f$) is set to 1.0. These parameters may be set to different values in other implementations. In this formulation, the darkening factor values decrease with the darkness levels of the pixels. That is, lower (i.e., darker) luminance (or gray) values are associated with lower darkness factors. Since the darkness factors influence pixel values in a multiplicative way in the implementation described below, darker pixels (i.e., pixels with lower luminance values) identified as redeye pixels are darkened more than lighter pixels (i.e., pixels with higher luminance values).

The weights (wt) are set for a given redeye pixel based on the number of redeye pixels that neighbor the given pixel. For example, in one implementation, the weights may be set as follows:

$$wt = \begin{cases} 0 & \text{redeye neighbors} = 0 \\ .33 & \text{redeye neighbors} = 1, 2, 3 \\ .67 & \text{redeye neighbors} = 4, 5, 6 \\ 1 & \text{redeye neighbors} = 7, 8 \end{cases} \quad (21)$$

where redeye neighbors corresponds to the number of redeye pixels that neighbor the given pixel being assigned a weighting factor. In this formulation, redeye pixels near the center of the redeye pixel correction region 228 are assigned higher weights than redeye pixels near the boundaries of the redeye pixel correction region 278.

Color values of redeye pixels are corrected by desaturating and darkening original color values in accordance with the computed darkening and weight factors. In some RGB color space implementations, the color values (red, green, blue) of each input image pixel identified as a redeye pixe are corrected to the final color values ($R_1$, $G_1$, $B_1$) as follows:

```
If (mask = 1), tmp = dark[green − grn_min]
Else tmp = 1
    R_1 = (wt * tmp * green + (1 − wt) * red)
    G_1 = (wt * tmp * green + (1 − wt) * green)
    B_1 = (wt * tmp * green + (1 − wt) * blue)
```

In these embodiments, it is assumed that the color components of the input image pixels are defined with respect to the RGB color space. These embodiments readily may be extended to other color space representations. It is noted that if wt=1, pixel values are pushed all the way to neutral (i.e., the pixel values are set to the same shade of gray). If wt=0, none of the color component values of the corresponding pixel are changed. In this implementation, lower luminance pixels (i.e., smaller green values) generally are pushed darker than higher luminance pixels, which have their luminance unchanged.

D. Re-Coloring Redeye Pixels Containing Large Glowing Glint

Figure 30:
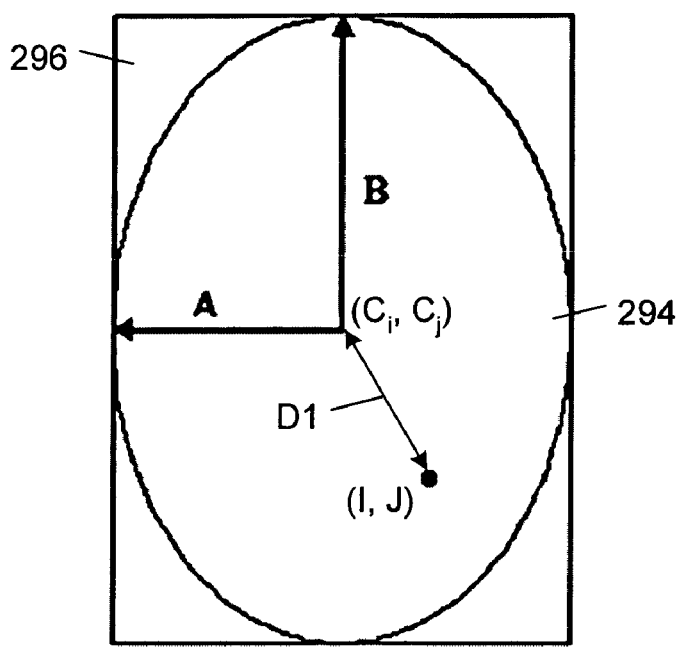
FIG. 30 is a diagrammatic view of a redeye pixel area and an inscribed glint correction region.

Referring to FIGS. 30A and 30B, in some cases, the redeyes in input image 12 appear to be large and "glowing" (i.e., the glint of the redeye appears to be much brighter than the surrounding regions). In these cases, the color attributes of the redeye regions still may be very reddish, but the colors are sufficiently saturated that these redeyes appear as a white, bright region. This class of glowing redeyes typically constitutes a small percent (e.g., on the order of about 5%) of the total redeyes detected by redeye detection module 14.

As shown in FIG. 30B, in some cases, the appearance of this type of redeye is "objectionable" even after the redeyes are corrected using the re-coloring process described above in section III.C. The objectionable large glowing glint typically is caused primarily from the fact that too many pixels within the candidate redeye pixel areas detected by the redeye detection module 14 are classified as non-redeye pixels and therefore are not re-colored by the redeye correction process of section III.C.

Figure 31:
FIG. 31 is an image of the boy shown in FIG. 28B after the glowing redeyes have been corrected by the method of FIG. 29.

Referring to FIGS. 31 and 32, after the re-coloring process of section III.C., the redeye pixel areas may be processed as following to correct redeye pixel areas containing large glowing glint. Initially, each redeye pixel area is classified based on glint (steps 290, 292). In one implementation, redeye pixel areas are classified as containing large glowing glint if the percentage of the non redeye pixels in an oval glint correction region 294 inscribed in a redeye box 296 corresponding to the detected redeye pixel area is greater than a heuristically determined threshold (see FIG. 32). In another implementation, redeye pixel areas are classified as containing large glowing glint if the average luminance value computed over the oval glint correction region 294 is greater than a heuristically determined threshold. In another implementation, redeye pixel areas are classified as containing large glowing glint if the average luminance value computed over the oval glint correction region 294 is greater than the average luminance value computed over the regions of red box 296 surrounding oval glint correction region 294 by a heuristically determined threshold.

If a redeye pixel area is classified as containing large glowing glint (step 298), the center $(C_i, C_j)$ of the glint correction region 294 is computed (step 300).

In one implementations, the center $(C_i, C_j)$ of the glint correction region 294 is the location of the pixel with the maximal luminance value. In instances in which there are multiple pixels with the maximal luminance value, the pixel location that is closest to the average of the locations of the pixels with the maximal luminance value is selected as the center $(C_i, C_j)$ of the glint correction region 294.

For each pixel within the oval glint correction region 294, the distance D1 to the center $(C_i, C_j)$ of the glint correction region 294. The darkening factor α for each pixel is computed as follows (step 302):

$$\alpha = 1.0 - 0.3\left(\frac{D1}{D2}\right)^{0.005}$$

where $D2=(A^2+B^2)^{1/2}$, and A and B correspond to one-half of the lengths the semiminor and semimajor axes of the oval glint correction region 294, respectively. The pixels within the glint correction region 294 are darkened in accordance with the computed darkening factors as follows (step 304):

$$Red_{FINAL} = \alpha \cdot Red_{INITIAL}$$

$$Green_{FINAL} = \alpha \cdot Green_{INITIAL}$$

$$Blue_{FINAL} = \alpha \cdot Blue_{INITIAL}$$

where $Red_{FINAL}$, $Green_{FINAL}$, and $Blue_{FINAL}$ are the final darkened red, green, and blue color values for the glint corrected pixel, and $Red_{INITIAL}$, $Green_{INITIAL}$, and $Blue_{INITIAL}$ are the initial red, gree, and blue color values of the pixel after the re-coloring process of section III.C.

FIG. 33 shows a glint-corrected version of the re-colored image of FIG. 30B.

IV. Conclusion

Other embodiments are within the scope of the claims.

What is claimed is:

1. A method of processing an input image, comprising:
   identifying a set of candidate redeye pixel areas in the input image;
   projecting input image data into a feature space spanned by multiple features to generate feature vectors respectively representing the candidate redeye pixel areas in the feature space, wherein each of the feature vectors comprises a respective set of weights corresponding to respective ones of the features, and the projecting comprises for each of the feature vectors determining a respective one of the weights from multiple values of a statistical measure that are derived from respective sets of image values corresponding to different respective regions of the input image; and
   filtering from the set ones of the candidate redeye pixel areas classified as non-redeye pixel areas based on the generated feature vectors.

2. The method of claim 1, wherein at least some of the features are contrast features corresponding to respective measurements of local contrast.

3. The method of claim 2, wherein the contrast features are orientation independent with respect to the input image.

4. The method of claim 2, wherein a given contrast feature weight is computed based on a feature template and a feature plane.

5. The method of claim 4, wherein at least one feature plane corresponds to a mapping of input image data to a grayscale image.

6. The method of claim 4, wherein at least one feature plane corresponds to a mapping of input image data to an a-plane in a CIE-Lab color space representation of the input image data.

7. The method of claim 4, wherein at least one feature plane corresponds to a mapping of input image data to a redness image.

8. The method of claim 1, wherein the projecting comprises for each of the candidate redeye pixel areas
determining a respective iris area, and
calculating at least one weight of the respective feature vector from a proportion of pixels in a neighborhood of the respective iris area that are classified as skin tone pixels.

9. The method of claim 1, wherein the projecting comprises for each of the candidate redeye pixel areas
measuring an aspect ratio of the candidate redeye pixel area, and
calculating at least one weight of the respective feature vector based on the measured aspect ratio.

10. The method of claim 1, wherein at least one feature is based on a ratio of pixels in a candidate redeye pixel area classified as redeye pixels.

11. The method of claim 1, wherein the projecting comprises for each of the candidate redeye pixel areas
measuring a dynamic range of pixel values in a central basis region of the candidate redeye pixel area, and
calculating at least one weight of the respective feature vector based on the measured dynamic range.

12. The method of claim 1, wherein the projecting comprises for each of the candidate redeye pixel areas
measuring a standard deviation of pixel values in a central basis region of the candidate redeye pixel area, and
calculating at least one weight of the respective feature vector based on the measured standard deviation.

13. The method of claim 1, wherein the determining comprises calculating the respective one of the weights from an average of the image values in each of the respective sets of image values.

14. The method of claim 13, wherein the calculating comprises determining the respective one of the weights from one or more differences between the averages of the image values in the respective sets of image values.

15. The method of claim 1, wherein the determining comprises calculating the respective one of the weights from one or more extrema in each of the respective sets of image values.

16. The method of claim 15, wherein the calculating comprises determining the respective one of the weights from a difference between maxima and minima in each of the respective sets of image values.

17. A method of processing an input image, comprising:
identifying a set of candidate redeye pixel areas in the input image;
projecting input image data into a feature space spanned by multiple features to generate feature vectors respectively representing the candidate redeye pixel areas in the feature space, wherein at least some of the features are contrast features corresponding to respective measurements of local contrast, a given contrast feature weight is computed based on a feature template and a feature plane, and the feature template is a concentric template specifying a contrast measurement between a central basis region and a basis region surrounding the central basis region; and
filtering candidate redeye pixel areas from the set based on the generated feature vectors.

18. The method of claim 17, wherein the surrounding basis region is contiguous with the central basis region.

19. The method of claim 17, wherein the surrounding basis region is spaced apart from the central basis region.

20. A method of processing an input image, comprising:
identifying a set of candidate redeye pixel areas in the input image;
projecting input image data into a feature space spanned by multiple features to generate feature vectors respectively representing the candidate redeye pixel areas in the feature space, wherein at least some of the features are contrast features corresponding to respective measurements of local contrast, a given contrast feature weight is computed based on a feature template and a feature plane, and the feature template is a circular template specifying a contrast between a central basis region and a basis region adjacent to the central basis region; and
filtering candidate redeye pixel areas from the set based on the generated feature vectors.

21. The method of claim 20, wherein computing the given contrast feature weight comprises computing contrast values for multiple rotational orientations of the feature template.

22. The method of claim 21, wherein computing the given contrast feature weight further comprises assigning an extrema of the computed contrast values to the given contrast feature weight.

23. A method of processing an input image, comprising:
identifying a set of candidate redeye pixel areas in the input image;
projecting input image data into a feature space spanned by multiple features to generate feature vectors respectively representing the candidate redeye pixel areas in the feature space, wherein at least some of the features are contrast features corresponding to respective measurements of local contrast, a given contrast feature weight is computed based on a feature template and a feature plane, and the feature template is a circular template specifying a contrast measurement between a pair of basis regions respectively located at opposite ends of a first axis crossing a central region at a first angle and an adjacent pair of basis regions respectively located at opposite ends of a second axis crossing the central region at a second angle different from the first angle; and
filtering candidate redeye pixel areas from the set based on the generated feature vectors.

24. The method of claim 23, wherein the first and second axes are orthogonal.

25. A method of processing an input image, comprising:
identifying a set of candidate redeye pixel areas in the input image;
projecting input image data into a feature space spanned by multiple features to generate feature vectors respectively representing the candidate redeye pixel areas in the feature space, wherein at least some of the features are contrast features corresponding to respective measurements of local contrast, a given contrast feature weight is computed based on a feature template and a feature plane, each feature plane is a scalar image computed from input image data, and at least one feature plane corresponds to a mapping of input image data to one of a grayscale image, a CIE-Lab color space representation of the input image data, and a redness image.

26. A method of processing an input image, comprising:
  identifying a set of candidate redeye pixel areas in the input image;
  projecting input image data into a feature space spanned by multiple features to generate feature vectors respectively representing the candidate redeye pixel areas in the feature space, wherein at least some of the features are contrast features corresponding to respective measurements of local contrast, a given contrast feature weight is computed based on a feature template and a feature plane, and each feature template is defined by a set of basis regions and a scale factor; and
  filtering candidate redeye pixel areas from the set based on the generated feature vectors.

27. The method of claim 26 wherein the scale factor specifies a scale for the basis regions relative to a candidate redeye pixel area.

28. A system for processing an input image, comprising a memory and a redeye detection module operable to:
  identify a set of candidate redeye pixel areas in the input image;
  project input image data into a feature space spanned by multiple features to generate feature vectors respectively representing the candidate redeye pixel areas in the feature space, wherein each of the feature vectors comprises a respective set of weights each of which is computed for a respective one of the features, and for each of the feature vectors the redeye detection module is operable to determine a respective one of the weights from multiple values of a statistical measure that are derived from respective sets of image values corresponding to different respective regions of the input image; and
  filter from the set ones of the candidate redeye pixel areas classified as non-redeye pixel areas based on the generated feature vectors.

29. A method of processing an input image, comprising:
  identifying a set of candidate redeye pixel areas in the input image;
  for each of the candidate redeye pixel areas, determining a respective feature vector comprising weights, wherein the determining comprises
    calculating each of the weights in accordance with a respective feature template comprising a respective spatial pattern of basis regions each of which is associated with a respective rule for calculating a respective component weight value from values in a respective region of a scalar image derived from values of the input image,
    wherein the calculating comprises for each of the weights,
      calculating each of the respective component weights by applying the respective rules associated with the basis regions to values of respective regions of the scalar image, and
      combining the component weight values to produce the weight; and
  filtering from the set ones of the candidate redeye pixel areas classified as non-redeye pixel areas based on the determined feature vectors.

* * * * *

UNITED STATES PATENT AND TRADEMARK OFFICE
CERTIFICATE OF CORRECTION

| | |
|---|---|
| PATENT NO. | : 7,333,653 B2 |
| APPLICATION NO. | : 10/653019 |
| DATED | : February 19, 2008 |
| INVENTOR(S) | : Huitao Luo et al. |

Page 1 of 1

It is certified that error appears in the above-identified patent and that said Letters Patent is hereby corrected as shown below:

In column 6, line 29, after "identifying" delete "is".

In column 15, line 64, delete "Single-eve" and insert -- Single-eye --, therefor.

Signed and Sealed this

Fifteenth Day of July, 2008

JON W. DUDAS
*Director of the United States Patent and Trademark Office*